(12) United States Patent
Li et al.

(10) Patent No.: US 6,749,967 B2
(45) Date of Patent: Jun. 15, 2004

(54) POSITIVE ELECTRODE ACTIVE MATERIAL AND NON-AQUEOUS ELECTROLYTE CELL

(75) Inventors: Guohua Li, Kanagawa (JP); Atsuo Yamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 148 days.

(21) Appl. No.: 09/842,483

(22) Filed: Apr. 25, 2001

(65) Prior Publication Data

US 2001/0055718 A1 Dec. 27, 2001

(30) Foreign Application Priority Data

Apr. 25, 2000 (JP) ..................... P2000-128999
Apr. 25, 2000 (JP) ..................... P2000-129000

(51) Int. Cl.[7] ............................. H01M 4/58
(52) U.S. Cl. .............. 429/231.95; 429/221; 429/224; 429/231.5; 429/219
(58) Field of Search ............ 429/231.95, 224, 429/219, 221

(56) References Cited

U.S. PATENT DOCUMENTS

| | | | |
|---|---|---|---|
| 4,049,879 A | * | 9/1977 | Thompson .............. 429/191 |
| 5,807,646 A | * | 9/1998 | Iwata ..................... 429/224 |
| 5,910,382 A | * | 6/1999 | Goodenough et al. ... 429/218.1 |
| 6,300,013 B1 | * | 10/2001 | Yamada et al. ......... 429/231.8 |
| 6,322,929 B1 | * | 11/2001 | Takada ................... 429/314 |
| 6,391,493 B1 | * | 5/2002 | Goodenough ........... 429/218.1 |
| 6,458,488 B1 | * | 10/2002 | Honbo .................... 429/224 |
| 2002/0106564 A1 | * | 8/2002 | Okawa .................... 429/221 |

FOREIGN PATENT DOCUMENTS

| | | | | |
|---|---|---|---|---|
| EP | 1195836 | * | 4/2002 | .......... H01M/10/40 |
| JP | 11-025983 | * | 7/1997 | ............ H01M/4/58 |

* cited by examiner

Primary Examiner—Mark Ruthosky
(74) Attorney, Agent, or Firm—Sonnenschein, Nath & Rosenthal LLP

(57) ABSTRACT

A positive electrode active material and a non-aqueous electrolyte cell which uses the positive electrode active material. The cell has a high discharge voltage without lowering the capacity and superior charging/discharging characteristics. To this end, the positive electrode active material contains a compound represented by the general formula $Li_xMn_yFe_{1-y}PO_4$, wherein $0<x\leq2$ and $0.5<y<0.95$, or a compound represented by the general formula $Li_xMn_yA_{1-y}PO_4$, where $0<x\leq2$ and $0<y<1$ and wherein A is a metal element selected from among Ti, Zn, Mg and Co or plural metal elements selected from among Ti, Fe, Zn, Mg and Co.

14 Claims, 27 Drawing Sheets

US 6,749,967 B2

POSITIVE ELECTRODE ACTIVE MATERIAL AND NON-AQUEOUS ELECTROLYTE CELL

RELATED APPLICATION DATA

The present application claims priority to Japanese Applications Nos. P2000-128999 filed Apr. 25, 2000 and P2000-129000 filed Apr. 25, 2000, which applications are incorporated herein by reference to the extent permitted by law.

BACKGROUND OF THE INVENTION

This invention relates to a positive electrode active material, capable of reversibly doping/undoping lithium, and to a non-aqueous electrolyte cell which uses this positive electrode active material.

Recently, with rapid progress in a variety of electronic equipment, investigations into a re-chargeable secondary cell, as a cell that can be used conveniently economically for prolonged time, are proceeding briskly. Representatives of the secondary cells are a lead accumulator, an alkali accumulator and a lithium secondary cell.

Among these secondary cells, a lithium secondary cell has various advantages, such as high output or high energy density. The lithium secondary cell is made up of a positive electrode and a negative electrode, each having an active material capable of reversibly doping/undoping lithium, and a non-aqueous electrolyte.

Among known positive electrode active materials of the lithium secondary cell, there are a metal oxide, a metal sulfide and a polymer. For example, there are known lithium-free compounds, such as, for example, TiS2, MoS2, MbSe2 or V2O5, and lithium compound oxides, such as LiMO2, where M is Co, Ni, Mn or Fe, or LiMn2O4.

As the positive electrode active material, having the potential of 4V with respect to lithium, $LiCoO_2$ is being put to extensive use. This $LiCoO_2$ is an ideal positive electrode in many respects in that it has a high energy density and a high voltage.

However, Co is a rare resource localized on the earth and hence it is expensive. Moreover, it cannot be furnished in stability without considerable difficulties. So, a demand is raised towards developing a positive electrode material which is based on inexpensive Ni or Mn and which is present in abundance as a resource.

The positive electrode containing $LiNiO_2$ has a large theoretical capacity and a high discharging potential. However, it has such a defect that, with the progress in the charging/discharging cycle, the crystal structure of $LiNiO_2$ is collapsed to lower the discharging capacity as well as the thermal stability.

As a Mn-based positive electrode material, $LiMn_2O_4$ having a positive spinel structure and a spatial group Fd3m has been proposed. This $LiMn_2O_4$ has a high potential of the 4V-grade potential with respect to lithium, which is equivalent to $LiCoO_2$. Moreover, $LiMn_2O_4$ is easy to synthesize and high in cell capacity so that it is a highly promising material and is being put to practical use.

However, the cell formed using $LiMn_2O_4$ has a drawback that it undergoes serious deterioratiuon in capacity on storage at elevated temperatures, while it is insufficient in stability and cyclic characteristics, with Mn being dissolved in an electrolytic solution.

So, it has been proposed in Japanese Laying-Open Patent H-9-134724 to use a phosphoric acid compound of a transition metal M having an olivinic structure as a positive electrode of the lithium ion cell, where M is Fe, Mn, Co or Ni. It has also been proposed in Japanese Laying-Open Patent H-9-171827 to use e.g., $LiFePO_4$, among the phosphoric acid compounds of the transition metal M having an olivinic structure.

It is noted that $LiFePO_4$ has a volumetric density as high as 3.6 g/cm$^3$ and develops a high potential of 3.4 V, with the theoretical capacity being as high as 170 mAh/g. Moreover, in the initial state, $LiFePO_4$ contains electrochemically dopable Li at a rate of one Li atom per Fe atom, and hence is a promising material as a positive electrode active material of the lithium ion cell.

However, as reported in the above patent publication, a real capacity only on the order of 60 to 70 mAh/g has been realized in an actual cell which uses $LiFePO_4$ as a positive electrode active material. Although the real capacity on the order of 120 mAh/g has been subsequently reported in the Journal of the Electrochemical Society, 144,1188 (1997), this capacity cannot be said to be sufficient in consideratiuon that the theoretical capacity is 170 mAh/g. There is also a problem that the discharging voltage of $LiFePO_4$ is 3.4V which is lower than that of the positive electrode active material used in the current lithium ion cell.

So, it has been proposed to use $LiMnPO_4$, as a phosphoric acid having an olivinic structure, comprised mainly of Mn, which is an element having a redox potential highrer than that of Fe, as the positive electrode of the lithium ion cell.

However, in the Mn-based routine phosphoric acid compound, comprised basically of $LiMnPO_4$, it is difficult to yield Mn by the redox reaction. It is reported in the aforementioned Journal of the Electrochemical Society, 144,1188 (1997) that, of the Mn-based phosphric compounds of the olivinic structure, only $LiMn_xFe_{1-x}PO_4$, in which Fe is substituted for part of Mn, is the sole phosphoric compound in which Mn can be generated by a redox reaction.

In the above treatise, there is a report that an actual cell constructed using $LiMn_xFe_{1-x}PO_4$ as a positive electrode active material can develop a real capacity of the order of 80 mAh/g. However, this capacity may not be said to be sufficient in consideratiion that the theoretical capacity is 170 mAh/g.

In the above treatise, there is a report that, in an actual cell which uses $LiMn_xFe_{1-x}PO_4$ as a positive electrode active material, the capacity is decreased when the proportion y of Mn exceeds 0.5. That is, according to the teaching in the above treatise, if the proportion Mn in $LiMn_xFe_{1-x}PO_4$ is increased, the capacity is decreased, even though the high voltage is achieved, and hence the compound is not suitable as a material for practical use. If conversely the proportion of Mn in $LiMn_xFe_{1-x}PO_4$ is lowered for realizing a high capacity, the proportion of Mn as a main reaction partner in the redox is lowered, with the result that the high redox potential proper to Mn cannot be sufficiently achieved. In addition, if the discharging voltage is lowered, the cell produced ceases to be compatible with the currently used lithium ion cell.

So, it is extremely difficult with $LiMn_xFe_{1-x}PO_4$ to realize high capacity and high discharge voltage simultaneously.

On the other hand, in the Mn-based phosphoric acid compound, having the olivinic structure, M has a high redox potential and hence the compound is expected to manifest excellent properties. However, only a few of the compounds may be used in a cell. Thus, a demand is raised towards development of the phosphoric acid compound having the olivinic structure.

SUMMARY OF THE INVENTION

It is therefore an object of the present invention to provide a positive electrode active material capable of realizing a high discharging capacity without lowering the capacity in order to manifest superior charging/discharging characteristics and a non-aqueous electrolyte cell which uses the positive electrode active material.

It is another object of the present invention to provide a positive electrode active material in which Mn generation by redox, not possible so far, is realized without lowering the capacity, and which exhibits a high discharging voltage and superior charging/discharging characteristics.

It is yet another object of the present invention to provide a non-aqueous electrolyte cell which uses such positive electrode active material.

In one aspect, the present invention provides a positive electrode active material containing a compound represented by the general formula $Li_xMn_yFe_{1-y}PO_4$, where $0<x\leq2$ and $0.5<y<0.95$.

In this positive electrode active material, Fe is substituted for a portion of Mn of $Li_xMn_yFe_{1-y}PO_4$. Since this Fe is able to dilute the Yarn-Teller effect ascribable to $Mn^{3+}$, it is possible to suppress distortion of the crystal structure of $Li_xMn_yFe_{1-y}PO_4$. Since the proportion y of Mn is in a range of $0.5<y<0.95$, a high discharge voltage can be achieved without lowering the cell capacity.

In another aspect, the present invention provides a positive electrode active material containing a compound represented by the general formula $Li_xMn_yFe_zA_{1-(y+z)}PO_4$, where $0<x\leq2$, $0.5<y<0.95$, $0.5<y+z<1$, and A is at least one metal element selected from Ti and Ag.

In this positive electrode active material, Fe and the metal element A are substituted for a portion of Mn in $Li_xMn_yFe_zA_{1-(y+z)}PO_4$. Since this Fe and the metal element A are able to dilute the Yarn-Teller effect ascribable to $Mn^{3+}$, it is possible to suppress distortion of the crystal structure of $Li_xMn_yFe_{1-y}PO_4$. Since the proportion y of Mn is in a range of $0.5<y<0.95$, a high discharge voltage can be achieved without lowering the capacity.

In another aspect, the present invention provides a non-aqueous electrolyte cell including a positive electrode containing a positive electrode active material, a negative electrode containing a negative electrode active material and an electrolyte interposed between the positive and negative electrodes, wherein the positive electrode active material contains a compound represented by the general formula $Li_xMn_yFe_{1-y}PO_4$ where $0<x\leq2$ and $0.5<y<0.95$.

In the above-described non-aqueous electrolyte cell, the Yarn-Teller effect ascribable to $Mn^{3+}$ is diluted to enable Mn to be yielded by the redox reaction. So, the non-aqueous electrolyte cell employing this positive electrode active material exhibits superior charging/discharging characteristics.

In another aspect, the present invention provides a non-aqueous electrolyte cell including a positive electrode containing a positive electrode active material, a negative electrode containing a negative electrode active material and an electrolyte interposed between the positive and negative electrodes, wherein the positive electrode active material contains a compound represented by the general formula $Li_xMn_yFe_zA_{1-(y+z)}PO_4$ where $0<x\leq2$, $0.5<y<0.95$ and $0.5<y+z<1$ and wherein A is at least one metal element selected from Ti and Mg.

With the above-described non-aqueous electrolyte cell, the Yarn-Teller effect ascribable to $Mn^{3+}$ is diluted to enable Mn to be yielded by the redox reaction. Moreover, since the proportion y of Mn in $Li_xMn_yFe_zA_{1-(y+z)}PO_4$ is in a range of $0.5<y<0.95$, a high discharge voltage can be achieved without lowering the cell capacity. Therefore, the non-aqueous electrolyte cell employing this positive electrode active material exhibits superior charging/discharging characteristics.

The present inventors also have conducted eager searches towards accomplishing the above object, and have found that Mn redox is difficult because the Yarn-Teller effect is produced due to $Mn^{3+}$ generated in the charged state to cause distortion of the crystal structure of the phosphoric acid compound having the olivinic structure. This finding has led to the concept of a positive electrode active material according to the present invention.

In another aspect, the present invention provides a positive electrode active material containing a compound represented by the general formula $Li_xMn_yB_{1-y}PO_4$, where $0<x\leq2$ and $0<y<1$ and wherein B is a metal element selected from among Ti, Zn, Mg and Co.

In this positive electrode active material, one metal element selected from among Ti, Zn, Mg and Co is substituted for a portion of Mn of $Li_xMn_yB_{1-y}PO_4$ as a phosphoric acid compound having the olivinic structure. Since this metal element is able to dilute the Yarn-Teller effect ascribable to $Mn^{3+}$, distortion of the crystal structure of $Li_xMn_yB_{1-y}PO_4$ can be prevented from occurring.

In another aspect, the present invention provides a positive electrode active material containing a compound represented by the general formula $Li_xMn_yB_{1-y}PO_4$, where $0<x\leq2$ and $0<y<1$ and wherein B denotes plural metal elements selected from among Ti, Fe, Zn, Mg and Co.

In this positive electrode active material, plural metal elements selected from among Ti, Fe, Zn, Mg and Co are substituted for a portion of Mn of $Li_xMn_yB_{1-y}PO_4$ which is a phosphoric acid compound having the olivinic structure. Since this metal element B is able to dilute the Yarn-Teller effect ascribable to $Mn^{3+}$, distortion of the crystal structure of $Li_xMn_yB_{1-y}PO_4$ can be prevented from occurring.

In another aspect, the present invention provides a non-aqueous electrolyte cell including a positive electrode containing a positive electrode active material, a negative electrode containing a negative electrode active material and an electrolyte interposed between the positive and negative electrodes, wherein the positive electrode active material contains a compound represented by the general formula $Li_xMn_yB_{1-y}PO_4$ where $0<x\leq2$ and $0<y<1$ and wherein B denotes one metal element selected from among Ti, Zn, Mg and Co.

This non-aqueous electrolyte cell contains $Li_xMn_yB_{1-y}PO_4$, as a positive electrode active material, in which a metal element B selected from among Ti, Zn, Mg and Co is substituted for a portion of Mn. Since the metal element B in the $Li_xMn_yB_{1-y}PO_4$, used as positive electrode active material, is able to dilute the Yarn-Teller effect ascribable to $Mn^{3+}$, distortion of the crystal structure of $Li_xMn_yB_{1-y}PO_4$ can be prevented from occurring, thus realizing a non-aqueous electrolyte cell having a high discharge capacity and superior charging/discharging characteristics.

In another aspect, the present invention provides a non-aqueous electrolyte cell including a positive electrode containing a positive electrode active material, a negative electrode containing a negative electrode active material and an electrolyte interposed between the positive and negative electrodes, wherein the positive electrode active material contains a compound represented by the general formula $Li_xMn_yB_{1-y}PO_4$ where $0<x\leq 2$ and $0<y<1$ and wherein B denotes plural metal elements selected from among Ti, Fe, Zn, Mg and Co.

This non-aqueous electrolyte cell contains $Li_xMn_yB_{1-y}PO_4$, as a positive electrode active material, in which plural metal elements B selected from among Ti, Fe, Zn, Mg and Co is substituted for a portion of Mn. Since the metal element B in the $Li_xMn_yB_{1-y}PO_4$, used as positive electrode active material, is able to dilute the Yarn-Teller effect ascribable to $Mn^{3+}$, distortion of the crystal structure of $Li_xMn_yB_{1-y}PO_4$ can be prevented from occurring. Thus, with $Li_xMn_yB_{1-y}PO_4$, redox generation of Mn is possible, so that a non-aqueous electrolyte cell having a high discharge capacity and superior charging/discharging characteristics may be produced.

According to the present invention, part of Mn of $Li_xMn_yFe_{1-y}PO_4$, used as a positive electrode active material, is replaced by Fe. Since this Fe is able to dilute the Yarn-Teller effect ascribable to $Mn^{3+}$, distortion of the crystal structure of $Li_xMn_yFe_{1-y}PO_4$ may be prevented from occurring. Moreover, since the proportion y of Mn is such that $0.5<y<0.95$, the range of the high discharge voltage area in the vicinity of 4V can be enlarged without decreasing the capacity. Thus, Mn can be produced by a redox reaction to allow to furnish a positive electrode active material capable of realizing a high capacity and a high discharge capacity.

Moreover, according to the present invention, part of Mn of $Li_xMn_yFe_{1-(y+z)}PO_4$, used as a positive electrode active material, is replaced by Fe and a metal element A. Since this Fe and the metal element A are able to dilute the Yarn-Teller effect ascribable to $Mn^{3+}$, distortion of the crystal structure of $Li_xMn_yFe_{1-(y+z)}PO_4$ may be prevented from occurring. Moreover, since the proportion y of Mn is set so that $0.5<y<0.95$, the range of the high discharge voltage area in the vicinity of 4V can be enlarged without decreasing the capacity. Thus, Mn can be produced by a redox reaction to allow to furnish a positive electrode active material capable of realizing a high capacity and a high discharge capacity.

According to the present invention, $Li_xMn_yFe_{1-y}PO_4$, in which Mn can be produced on redox and which achieves a high capacity and a high discharge voltage, is used as the positive electrode active material of the non-aqueous electrolyte cell. Thus, a non-aqueous electrolyte cell may be furnished having superior charging/discharging characteristics and which may be made compatible with the customary lithium cell.

Moreover, according to the present invention, $Li_xMn_yFe_{1-(y+z)}PO_4$, in which Mn can be produced on redox and which achieves a high capacity and a high discharge voltage, is used as the positive electrode active material of the non-aqueous electrolyte cell. Thus, a non-aqueous electrolyte cell may be furnished having superior charging/discharging characteristics and which may be made compatible with the customary lithium cell.

The positive electrode active material according to the present invention contains Mn-based $Li_xMn_yA_{1-y}PO_4$ of the olivinic structure, in which a metal element selected from among Ti, Zn, Mg and Co is substituted for part of Mn. In this $Li_xMn_yA_{1-y}PO_4$, a metal element selected from among Ti, Zn, Mg and Co is substituted for part of Mn, or plural metal elements selected from among Ti, Fe, Zn, Mg and Co are substituted for part of Mn. Since the metal element A is able to dilute the Yarn-Teller effect ascribable to $Mn^{3+}$, it is possible to suppress distortion of the crystal structure of $Li_xMn_yA_{1-y}PO_4$. Thus, according to the present invention, a positive electrode active material may be furnished in which Mn generation on redox, so far retained to be difficult, can be realized to assure a high discharge voltage and superior charging/discharging characteristics.

The non-aqueous electrolyte cell according to the present invention uses $Li_xMn_yA_{1-y}PO_4$, capable of generating Mn on redox, is used as positive electrode active material, thus realizing a non-aqueous electrolyte cell having a high discharge voltage and superior charging/discharging characteristics.

DESCRIPTION OF THE PREFERRED EMBODIMENTS

Figure 1:
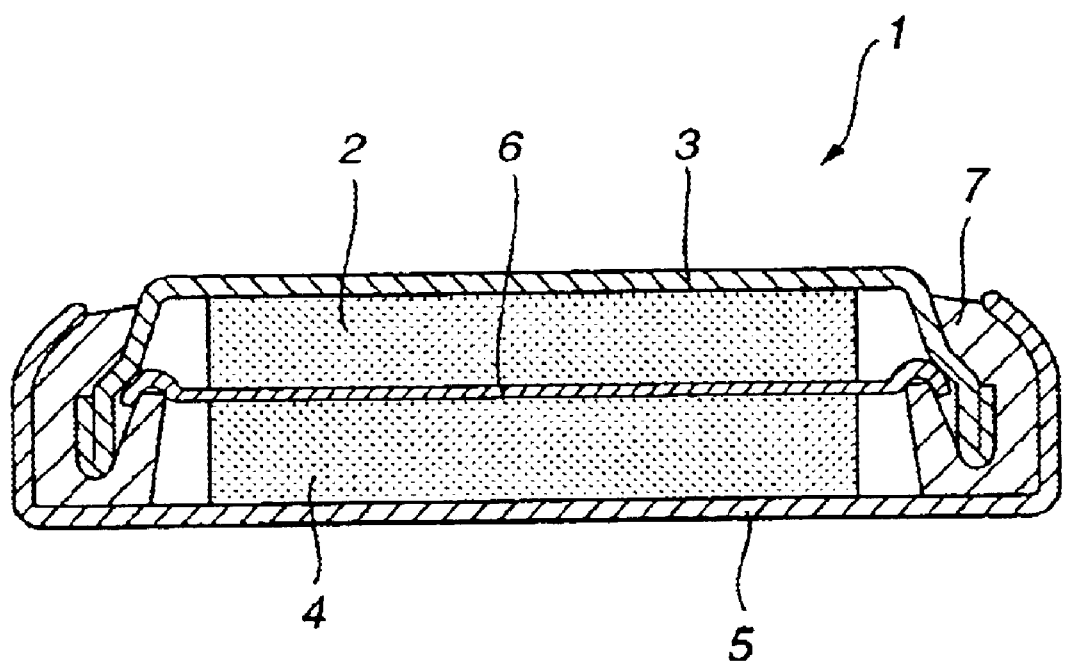
FIG. 1 is a cross-sectional view showing an illustrative structure of a non-aqueous electrolyte cell according to the present invention.

Referring to the drawings, preferred embodiments of a positive electrode active material and a non-aqueous electrolyte cell according to the present invention will be explained in detail.

In the present invention, a positive electrode active material has an olivinic structure and contains a compound represented by the general formula $Li_xMn_yFe_{1-y}PO_4$, where $0<x\leq2$ and $0.5<y<0.95$.

Also, in the present invention, a positive electrode active material has an olivinic structure and contains a compound represented by the general formula $Li_xMn_yB_{1-y}PO_4$, where $0<x\leq2$, $0<y<1$ and B is a metal element selected from the group of Ti, Fe, Zn, Mg and Co.

If the metal element B is comprised of a sole metal element, the compound represented by $Li_xMn_yB_{1-y}PO_4$ may specifically be enumerated by $Li_xMn_yTi_{1-y}PO_4$, $Li_xMn_yZn_{1-y}PO_4$, $Li_xMn_yMg_{1-y}PO_4$ and $Li_xMn_yCo_{1-y}PO_4$.

If the metal element B is comprised of plural elements, the compound represented by $Li_xMn_yB_{1-y}PO_4$ may be enumerated by $Li_xMn_y(Ti, Co)_{1-y}PO_4$, $Li_xMn_y(Ti, Fe)_{1-y}PO_4$, $Li_xMn_y(Ti, Zn)_{1-y}PO_4$, $Li_xMn_y(Ti, Co)_{1-y}PO_4$, $Li_xMn_y(Fe, Zn)_{1-y}PO_4$, $Li_xMn_y(Fe, Mg)_{1-y}PO_4$, $Li_xMn_y(Fe, Co)_{1-y}PO_4$, $Li_xMn_y(Zn, Mg)_{1-y}PO_4$, $Li_xMn_y(Zn, Co)_{1-y}PO_4$ and $Li_xMn_y(Mg, Co)_{1-y}PO_4$, where the proportions of the elements in parantheses ( ) are arbitrary.

Heretofore, if $LiMnPO_4$ of an olivinic structure, mainly composed of Mn, is used a positive electrode active material for the lithium secondary cell, the resulting lithium secondary cell is difficult to oeprate as a cell. Although the reason therefor is not necessarily clear, it may presumably be the following:

When the cell is in a charged state, that is as Li is taken out from $LiMnPO_4$ having the olivinic structure, $Mn^{2+}$ is oxidized to $Mn^{3+}$, which $Mn^{3+}$ gives rise to the Yarn-Teller effect to induce the inter-element interaction of $Mn^{3+}$—O—$Mn^{3+}$. Since this interaction bertween elements by the Yarn-Teller effect distorts the entire crystal structure of $LiMnPO_4$, the Mn redox reaction becomes difficult to take place to obstruct the operation as the cell.

So, the positive electrode active material according to the present invention contains $Li_xMn_yFe_{1-y}PO_4$, corresponding to Mn-based $LiMnPO_4$ of the olivinic structure in which part of Mn is replaced by Fe.

The Fe partially replacing Mn is able to sever the interaction between elements of $Mn^{3+}$—O—$Mn^{3+}$ which is produced when $Li_xMn_yFe_{1-y}PO_4$ is in the electrically charged state. That is, since the Yarn-Tellereffect by $Mn^{3+}$ is diluted, the distortion of the $Li_xMn_yFe_{1-y}PO_4$ as the entire crystal structure is suppressed to a level capable of yielding Mn by the redox reaction. So, the positive electrode active material, containing the compound of the olivinic structure represented by $Li_xMn_yFe_{1-y}PO_4$ is able to yield Mn by the redox reaction to realize the cell operation.

Meanwhile, the charging/discharging characteristics of this $Li_xMn_yFe_{1-y}PO_4$ exhibit two characteristic flat discharge voltage areas in the vicinitry of 4V and in the vicinity of 3.6V. In routine $Li_xMn_yFe_{1-y}PO_4$, if the proportion of Mn is increased to realize a high voltage, that is if the proportion of Mn exceeds 0.5, the discharge capacity of the entire cell is lowered. The result is that superior properties of Mn of high redox potential cannot be sufficiently displayed such that only a low discharge voltage can be achieved.

However, with $Li_xMn_yFe_{1-y}PO_4$, synthesized by a technique as described subsequently, a high discharge capacity can be maintained even in a range in which the proportion y of Mn exceeds 0.5. Since the proportion of Mn, as an element having a high redox potential, in $Li_xMn_yFe_{1-y}PO_4$, can be increased with respect to Fe, the capacity of the discharge voltage in the vicinity of 4V as a higher voltage can be increased. That is, $Li_xMn_yFe_{1-y}PO_4$ is able to realize a high discharging voltage, as a high capacity is maintained, if the proportion y of Mn exceeds 0.5.

Specifically, the proportion y of Mn is set so that $0.5<y<0.95$. That is, if the proportion y of Mn is not larger than 0.5, the proportion of Mn in $Li_xMn_yFe_{1-y}PO_4$ is small to cause the lowering of the discharge voltage. On the other hand, if the proportion y of Mn is not less than 0.95, the proportion of Fe is small so that the Yarn-Teller effect by Fe tends to fall short to render Mn generation by the redox reaction difficult.

It is also desirable for a portion of $Li_xMn_yFe_{1-y}PO_4$ to be not larger than 10 $\mu$m in crystal grain size. If $Li_xMn_yFe_{1-y}PO_4$ contained in the positive electrode active material in its entirety is of a crystal grain size 10 $\mu$m in crystal grain size or larger, crystallization proceeds excessively such that coarse crystal grains are liable to be predominant in $Li_xMn_yFe_{1-y}PO_4$. The result is that lithium as charge carrier cannot be diffused smoothly in the crystal grains of the positive electrode active material.

If $Li_xMn_yFe_{1-y}PO_4$ contains crystals with crystal grain size not larger than 10 $\mu$m in size, it is possible to assure smooth lithium ion diffusion in the positive electrode active material.

Moreover, the positive electrode active material of the present invention contains $Li_xMn_yB_{1-y}PO_4$ having a structure such that an adequately selected metal element B is substituted for Mn in Mn-based $LiMnPO_4$ of the olivinic structure.

The metal element B, partially substituted for Mn, is able to sever the interaction between the elements $Mn^{3+}$—O—$Mn^{3+}$ produced when $Li_xMn_yB_{1-y}PO_4$ is in an electrically charged state. That is, since the Yarn-Teller effect by $Mn^{3+}$ is diluted, the distortion of the entire crystal structure of $Li_xMn_yB_{1-y}PO_4$ is suppressed to a level with which it is possible to yield Mn by the redox reaction. So, with the positive electrode active material of the olivinic structure, containing the compound represented by $Li_xMn_yB_{1-y}PO_4$, it is possible to permit Mn to be yielded by the redox reaction to realize the operation as the cell.

In this $Li_xMn_yB_{1-y}PO_4$, the proportion y of Mn may be such that 0<y<1. That is, the metal element B(1-y) can be partially substituted for Mn in a range of 0<(1-y)<1. However, the metal element B (1-y) may preferably be partially substituted for Mn in a range of $0.05 \leq (1-y) \leq 0.5$. If the proportion 1-y of the metal element B is less than 0.05, the effect of diluting the Yarn-Teller effect ascribable to $Mn^{3+}$ tends to fall short. If the proportion 1-y of the metal element B exceeds 0.5, the proportion of Mn, playing the dominating role in the redox reaction, in $Li_xMn_yB_{1-y}PO_4$, is in shortage, thus possibly loweing the energy density of the cell.

In addition, a portion of $Li_xMn_yB_{1-y}PO_4$ is desirably of a grain size not larger than 10 $\mu$m. If $Li_xMn_yB_{1-y}PO_4$, contained by the positive electrode active material, is of a particle size 10 $\mu$m or more in its entirety, it is feared that crystallization proceeds excessively such that coarse-sized crystal grains account for a major portion of $Li_xMn_yB_{1-y}PO_4$. The result is that lithium as a charge carrier possibly cannot be diffused in the particles of the positive electrode active material.

If a certain portion of $Li_xMn_yB_{1-y}PO_4$ has a grain size 10 $\mu$m or less, it is possible to provide for smooth diffusion of lithium ions in the positive electrode active material.

Moreover, in the $Li_xMn_yFe_{1-y}PO_4$ and $Li_xMn_yB_{1-y}PO_4$, the Bulnauer Emmet Taylor (BET) specific surface area is preferably not less than 0.5 $m^2/g$. In the case of the positive electrode active material of a larger grain size, the surface area is diminished. If, under this condition, a large current is caused to flow, that is if a large amount of lithium ions are to be introduced within a short time, diffusion of lithium in the active material cannot catch up with the supply of lithium from outside, thus apparently decreasing the volume. So, in order to provide a sufficient capacity under a large current, means must be provided to enlarge the specific surface area and hence to reduce the grain size.

By having the BET specific surface area of the $Li_xMn_yFe_{1-y}PO_4$ and $Li_xMn_yB_{1-y}PO_4$, not less than 0.5 $m^2/g$, it is possible to speed up the diffusion of lithium in the active material to provide a sufficient capacity even under a large current condition.

Meanwhile, the compound represented by the above-mentioned general formula $Li_xMn_yFe_{1-y}PO_4$ may be of a structure in which part of Mn is replaced by Fe on one hand and at least one metal element A selected from the group of Ti and Mg. That is, the positive electrode active material may contain a compound represented by the general formula $Li_xMn_yFe_zA_{1-(y+z)}PO_4$ where $0<x \leq 2$, $0.5<y<0.9$ and $0.5<y+z<1$, A being at least one metal element selected from the group of Ti and Mg.

In this $Li_xMn_yFe_zA_{1-(y+z)}PO_4$, the substitution element A is able to sever the element-to-element interaction of $Mn^{3+}$—O—$Mn^{3+}$, produced when $Li_xMn_yFe_zA_{1-(y+z)}PO_4$ is in a charged state, as in the case of Fe described above. That is, since the Yarn-Teller effect by $Mn^{3+}$ is diluted, the distortion of the entire crystal structure of $Li_xMn_yFe_zA_{1-(y+z)}PO_4$ is suppressed to a level in which it is possible to generate Mn by the redox reaction. Consequently, the positive electrode active material, containing a compound of the olivinic structure, represented by $Li_xMn_yFe_zA_{1-(y+z)}PO_4$, enables Mn to be generated by a redox reaction to assure the operation as a cell.

Taking an exemplary compound represented by the general formula $Li_xMn_yFe_{1-y}PO_4$, the method for synthesizing a Mn-based phosphoric acid compound having the olivinic structure is hereinafter explained.

For synthesizing $Li_xMn_yFe_{1-y}PO_4$, plural starting materials for synthesis of the compound represented by the general formula $Li_xMn_yFe_{1-y}PO_4$ are mixed together to form a precursor. This precursor from the mixing step is sintered and reacted by way of performing a sintering step.

In the mixing step, iron oxalate $FeC_2O_4$, manganese oxide $MnCO_3$, ammonium hydrogen phosphate $NH_4H_2PO_4$ and lithium carbonate $Li_2CO_3$, as starting materials for synthesis, are mixed together at a pre-set ratio to from a precursor.

In the mixing process, starting materials for synthesis are mixed together sufficiently to mix respective starting materials homogeneously to increase contact points to render it possible to synthesize $Li_xMn_yFe_{1-y}PO_4$ at a temperature lower than the routinely used temperature.

In the sintering process, the above precursor is heated at a pre-set temperature in an inert gas atmosphere, such as nitrogen. This permits synthesis of $Li_xMn_yFe_{1-y}PO_4$.

Iron oxalate, used as a starting material for synthesis, has the decomposition temperature lower than that of iron phosphate hitherto used as a starting material for synthesis. Thus, by enploying iron oxalate as a starting material for synthesis, the reaction of synthesis of $Li_xMn_yFe_{1-y}PO_4$ can be carried out promptly. Moreover, by employing iron oxalate as a starting material for synthesis of $Li_xMn_yFe_{1-y}PO_4$, there is no risk of damaging e.g., a reaction device because no gases, such as acidic gases, which might affect the surrounding, are produced during firing.

In the above-described synthesis method, in which iron oxalate is used as the starting material for synthesis and the precursor is fired in a nitrogen stream, $Li_xMn_yFe_{1-y}PO_4$ can be synthesized at a temperature of 300° C. appreciably lower than the routinely used temperature of 800° C. In other words, $Li_xMn_yFe_{1-y}PO_4$ can be synthesized in a temperature range broader than that hitherto used to increase the latitude of selection of the precursor firing temperature (sintering temperature). It is noted that, if the sintering temperature is as high as 800° C., the energy consumption is correspondingly increased, while the load applied to the reaction device is also increased.

The present inventors directed attention to the relation between the temperature of firing the precursor in synthesizing $Li_xMn_yFe_{1-y}PO_4$ and the capacity of the cell which uses this $Li_xMn_yFe_{1-y}PO_4$ as an active material, and conducted researches into the optimum temperature for synthesizing $Li_xMn_yFe_{1-y}PO_4$ for realizing the high capacity.

As a result, it has been shown that the firing temperature for the $Li_xMn_yFe_{1-y}PO_4$ precursor is preferably not lower than 350° C. and not higher than 790° C. If the firing temperature is lower than 350° C., there is a risk that the chemical reaction and crystallization cannot preceed sufficiently such that homogeneous $Li_xMn_yFe_{1-y}PO_4$ cannot be produced. On the other hand, if the sintering temperature exceeds 790° C., crystallization tends to proceed in excess to retard the lithium diffusion. Thus, by sintering the precursor at a temperature range of 350° C. to 790° C. to synthesize $Li_xMn_yFe_{1-y}PO_4$, it is possible to synthesize homogeneous $Li_xMn_yFe_{1-y}PO_4$ to achieve a high capacity exceeding 120 mAh/g which is the capacity of $Li_xMn_yFe_{1-y}PO_4$ synthesized by the conventional manufacturing method.

The sintering temperature is more preferably in a range from 450° C. to 700° C. By firing the precursor in the range from 450° C. to 700° C. to synthesize $Li_xMn_yFe_{1-y}PO_4$, a real capacity an be achieved which approaches to 170 mAh/g as the theoretical capacity of $Li_xMn_yFe_{1-y}PO_4$.

In the manufacturing method for the positive electrode active material, described above, in which iron oxalate is used as the starting material, the synthesis reaction proceeds expeditiously, while no gas likely to pollute the surrounding is produced during the reaction. So, the single-phase $Li_xMn_yFe_{1-y}PO_4$ can be produced at a temperature lower than the routinely used temperature. So, with the present manufacturing method for the positive electrode active material, $Li_xMn_yFe_{1-y}PO_4$ capable of realizing the high capacity can be produced.

Meanwhile, if, in synthesizing $Li_xMn_yFe_{1-y}PO_4$, there is left residual air in the procursor, $Fe^{2+}$ in iron oxalate, as a bivalent iron compound, tends to be oxidized by oxygen in air to $Fe^{3+}$, so that a trivalent iron compound tends to be mixed into as-synthesized $Li_xMn_yFe_{1-y}PO_4$.

Therefore, in the above-described mixing process, it is desirable to add e.g., iron powders Fe as a reducing agent to a mixture at a pre-set mixing ratio of iron oxalate $FeC_2O_4$, manganese carbonate $MnCO_3$, ammonium hydrogen phosphate $NH_4H_2PO_4$ and lithium carbonate $Li_2CO_3$ and to mix these materials sufficiently to yield a precursor.

If $Fe^{2+}$ in iron oxalate, as a bivalent iron compound, is oxidized to $Fe^{3+}$ with oxygen in air contained in the precursor, the iron powder, contained in the precursor, reduces the $Fe^{3+}$ to $Fe^{2+}$. This prevents the trivalent iron compound from being mixed into as-synthesized $Li_xMn_yFe_{1-y}PO_4$, thus enabling a single-phase $Li_xMn_yFe_{1-y}PO_4$ to be produced.

The iron powder is added as a reducing agent, while becoming a part of the starting material for synthesis so as to be synthesized into the $Li_xMn_yFe_{1-y}PO_4$ as an ultimate product. If the reducing agent is a part of the spindle motor for synthesis of $Li_xMn_yFe_{1-y}PO_4$, it becomes unnecessary to remove the reducing agent left after the end of the reaction, thus enabling $Li_xMn_yFe_{1-y}PO_4$ to be synthesized efficiently.

If iron powders are used as a portion of the reducing agent or as a portion of the starting material for synthesis of $Li_xMn_yFe_{1-y}PO_4$, the iron powder is preferably added to the precursor in an amount ranging between 1 and 30 wt % to the sum total of Fe in the starting iron material. If the amount of addition of iron powders is less than 1 wt %, there is a risk that oxidation of $Fe^{2+}$ cannot be prevented sufficiently. Moreover, the iron powders Fe are low in reactivity as compared to $Fe^{2+}$ contained in iron oxalate $FeC_2O_4$, so that, if the amount of addition of the iron powders is more than 30 wt %, the synthesis reaction of $Li_xMn_yFe_{1-y}PO_4$ is not likely to progress sufficiently.

Thus, by setting the amount range of addition of the iron powders to 1 to 30 wt % with respect to Fe in the iron starting material, it is possible to prevent oxidation of $Fe^{2+}$ without obstructing the synthesis reaction to yield single-phase $Li_xMn_yFe_{1-y}PO_4$.

Except if a solid product is left over following the firing process, oxlic acid, formic acid or hydrogen, for example, may be used, besides iron powders, as the reducing agent.

In the above-described manufacturing method for the positive electrode active material, as described above, since the reducing agent is added to the precursor in synthesizing $Li_xMn_yFe_{1-y}PO_4$, the single-phase $Li_xMn_yFe_{1-y}PO_4$ can be synthesized without the risk of mixing of the impurities. Moreover, $Li_xMn_yFe_{1-y}PO_4$ can be synthesized at a temperature lower than the routinely used temperature. So, with the present positive electrode active material, $Li_xMn_yFe_{1-y}PO_4$ capable of realizing a high capacity can be produced.

By employing $Li_xMn_yFe_{1-y}PO_4$, synthesized as described above, as the positive electrode active material, lithium ions can be doped/undoped satisfactorily to enable a non-aqueous electrolyte cell to be produced which has a high capacity and superior cyclic characteristics.

The $Li_xMn_yFe_{1-y}PO_4$, which poves the positive electrode active material, may also be produced by the following method. First, plural substances, as starting material for a compound represented by the general formula $Li_xMn_yFe_{1-y}PO_4$, are mixed together in a mixing step to form a precursor. The precursor, formed in the mixing step, is freed of air in a de-airing step. The precursor, freed of air in the de-airing step, is fired and reacted by way of a sintering step to yield $Li_xMn_yFe_{1-y}PO_4$.

In the mixing step, iron acetate $Fe(CH_3COO)_2$, manganese carbonate $MnCO_3$, ammonium dihydrogen phosphate $NH_4H_2PO_4$ and lithium carbonate $Li_2CO_3$, as starting materials for synthesis, are mixed together at a pre-set ratio to give a precursor.

In the de-airing step, this precursor is homogenized sufficiently and de-aired to remove the air contained in the precursor. For de-airing, the atmosphere of the precursor is evacuated and an inert gas is then introduced. As another example of the de-airing, a solvent boiling at 250° C. or lower is caused to co-exist with the precursor to vaporize the dsolvent in the inert gas. This removes air contained in the precursor. Examples of the solvent boling at 250° C. or lower include water and ethanol.

In the sintering step, the precursor de-aired as described above, is sintered at a pre-set temperature in an inert gas atmosphere, such as nitrogen to synthesize $Li_xMn_yFe_{1-y}PO_4$.

If, in synthesizing $Li_xFe_{1-y}PO_4$, air is left over in the precursor, $Fe^{2+}$ in iron acetate, as a bivalent iron compound, is occasionally oxidized with oxygen in air to $Fe^{3+}$. The result is that a trivalent iron compound may occasionally be admixed as an inmpurity into as-synthesized $Li_xMn_yFe_{1-y}PO_4$.

So, in the above-described de-airign step, air contained in the precursor is removed by de-airing to prevent oxidation of $Fe^{2+}$ contained in iron acetate. This prevents the trivalent iron compound from being mixed into the as-synthesized $Li_xMn_yFe_{1-y}PO_4$ thus enabling the single-phase $Li_xMn_yFe_{1-y}PO_4$ to be produced.

The sintering temperature, that is the temperature at which the precursor is sintered in synthesizing $Li_xMn_yFe_{1-y}PO_4$, is preferably 350° C. to 790° C., as in the above-mentioned sintering temperature.

In the above-described method for the preparation of the positive electrode active material, the precursor is de-aired in synthesizing $Li_xMn_yFe_{1-y}PO_4$, thus preventing oxidation of $Fe^{2+}$. Moreover, $Li_xMn_yFe_{1-y}PO_4$ can be synthesized at a lower sintering temperature. Thus, with the present method for the preparation of the positive electrode active material, $Li_xMn_yFe_{1-y}PO_4$ capable of achieving a high capacity may be produced.

By employing $Li_xMn_yFe_{1-y}PO_4$, prepared as described above, as the positive electrode active material, lithium ioms are doped/undoped satisfactorily to enable a non-aqueous electrolyte cell of high apacity and superior cyclic characteristics to be produced.

The $Li_xMn_yFe_{1-y}PO_4$, used as the positive electrode active material, may also be produced as now explained. In this case, the positive electrode active material, containing $Li_xMn_yFe_{1-y}PO_4$, is synthesized as a composite sample formed of $Li_xMn_yFe_{1-y}PO_4$ and an electrification agent.

First, plural substances, as starting material for $Li_xMn_yFe_{1-y}PO_4$, are mixed together to form a precursor.

The precursor, obtained in the mixing step, is sintered and reacted by way of performing a sintering step. At this time, an electrification agent is added to the starting materials for synthesis or to the precursor.

The electrification agents may be enumerated by carbon, copper and electrically conductive high polymer material. The carbon may be exemplified by a variety of carbon blacks, such as graphite or acetylene black.

The electrification agent is preferably added in an amount range of 0.5 to 20 parts by weight to 100 parts by weight of $Li_xMn_yFe_{1-y}PO_4$. If the amount of the electrification agent is less than 0.5 wt %, no favorable effect is likely to be produced. If the amount of the electrification agent exceeds 20 wt %, the proportion of $Li_xMn_yFe_{1-y}PO_4$, as a main partner to the oxidation, in the positive electrode active material, is small, such that the non-aqueous electrolyte cell produced tends to be only low in energy density.

Thus, by adding electrification agent in an amount of 0.5 to 20 parts by weight to 100 parts by weight of $Li_xMn_yFe_{1-y}PO_4$, in the positive electrode active material, load characteristics as well as electrode moldability can be improved to achieve the high capacity of the non-aqueous electrolyte cell having the composite sample as the positive electrode active material.

As a manufacturing method for synthesizing a composite sample of the positive electrode active material, a manufacturing method for synthesizing a $Li_xMn_yFe_{1-y}PO_4$ carbon compound material, comprised of $Li_xMn_yFe_{1-y}PO_4$ and carbon as an electrification agent, is now explained.

In adding carbon to the precursor of $Li_xMn_yFe_{1-y}PO_4$ iron oxalate $FeC_2O_4$, ammonium dihydrogen phosphate $NH_4H_2PO_4$, lithium carbonate $Li_2CO_3$ and manganese acetate tetrahydride $Mn(CH_3CO)_2 \cdot 4H_2O$ or manganese carbonate $MnCO_3$ as starting materials for synthesis are mixed thoroughly at a pre-set mixing ratio to form a precursor. This precursor is calcined at a low temperature in an inert gas atmosphere such as nitrogen. The calcined precursor and carbon are mixed together and pulverized. In the sinrtering process, the resulting pulverized product is sintered at a pre-set temperature, in an inert gas atmosphere, to produce a $Li_xMn_yFe_{1-y}PO_4$ carbon compound material.

In adding carbon to the starting materials for synthesis of $Li_xMn_yFe_{1-y}PO_4$, carbon is added at the outset to a starting material for synthesis, comprised of iron oxalate $FeC_2O_4$, ammonium dihydrogen phosphate $NH_4H_2PO_4$, lithium carbonate $Li_2CO_3$ and manganese acetate tetrahydride $Mn(CH_3CO)_2 \cdot 4H_2O$ or manganese carbonate $MnCO_3$ and mixed together. The resulting mixture is then sintered at a pre-set temperature in an inert gas atmosphere, such as nitrogen, to produce a $Li_xMn_yFe_{1-y}PO_4$ carbon compound material.

In the above-described synthesis method, the starting materials for synthessis are mixed sufficiently to prepare a precursor. By mixing the starting materials for synthesis sufficiently, the respective starting materials are mixed together homogeneously to prepare a precursor having increased contact points. This precursor is sintered in a nitrogen atmosphere and synthesized to render it possible to sinter the precursor to synthesize a compoud sample at a temperature of, for example, 300° C., which is appreciably lower than 800° C. as the sintering temperature used in synthesizing $Li_xMn_yFe_{1-y}PO_4$ by the conventional method.

In other words, $Li_xMn_yFe_{1-y}PO_4$ carbon compound material can be synthesized in a temperature range broader than that hitherto used to increase the latitude of selection of the temperature used for synthesis. This sintering temperature is preferably not lower than 350° C. and not higher than 790° C. and more preferably not lower than 450° C. and not higher than 700° C.

In the manufacturing method for the compound sample made up of $Li_xMn_yFe_{1-y}PO_4$ and an electrification agent, a positive electrode active material having load characteristics and electrode moldability better than those of the positive electrode active material formed solely of $Li_xMn_yFe_{1-y}PO_4$ can be synthesized. If the electrification agent newly added in preparing the electrode is of minor quantity, the positive electrode active material, thus prepared, exhibits optimum load characteristics and electrode moldability. Moreover, the positive electrode active material, thus prepared, enables the use of an electrification agent of a higher volumetric density, such as graphite.

Thus, the non-aqueous electrolyte cell, containing the compound sample as the positive electrode active material, enables smooth electron migration in the electrode, thus being of high capacity and of optimum cyclic characteristics. The non-aqueous electrolyte cell may be of a large electrode volume, since there is no necessity of adding new electrification agent to the positive electrode mixture, thus assuring a high energy density.

In the foregoing description, the method for the preparation of a compounr, represented by $Li_xMn_yFe_{1-y}PO_4$, has been explained. If a compound represented by the general formula $Li_xMn_yFe_{1-(y+z)}PO_4$ is to be prepared, plural substances as the starting materials for the metal element A are mixed and otherwise the same method as the method for the preparation of $Li_xMn_yFe_{1-y}PO_4$ described above is followed to prepare $Li_xMn_yFe_{1-(y+z)}PO_4$.

According to the present invention, $Li_xMn_yB_{1-y}PO_4$ having the olivinic structure can be synthesized in a number of ways. If, for example, the metal element B is Ti, titanium oxide $TiO_2$, manganese carbonate $MnCO_3$, ammonium dihydrogen phosphate $NH_4H_2PO_4$ and lithium carbonate $Li_2CO_3$, as starting materials for synthesis, are mixed together to form a precursor. This precursor then is heated at a pre-set temperature in an inert gas atmosphere of e.g., nitrogen to synthesize $Li_xMn_yTi_{1-y}PO_4$.

Meanwhile, if the metal element B is another element, or is comprised of plural elements, corresponding compounds can be synthesized in a manner similar to synthesis of $Li_xMn_yTi_{1-y}PO_4$ described above. Specifically, a compound containing the metal element B, the aforementioned manganese carbonate $MnCO_3$, ammonium dihydrogen phosphate $NH_4H_2PO_4$ and lithium carbonate $Li_2CO_3$ are mixed together at a pre-set ratio to form a precursor. This precursor then is heated at a pre-set temperature in an inert gas atmosphere, such as nitrogen, to form $Li_xMn_yB_{1-y}PO_4$. The compounds containing metal elements B may be enumerated by, for example, magnesium oxalate $MgC_2O_4 \cdot 2H_2O$, zinc oxide ZnO, cobalt oxalate $CoC_2O_4 \cdot 2H_2O$ and iron oxalate $FeC_2O_4 \cdot 2H_2O$.

The specified heating temperature for the precursor is preferably not lower than 300° C. and not higher than 790° C. The olivinic single-phase $Li_xMn_yB_{1-y}PO_4$ can be obtained by heating the precursor within this temperature range. If the synthesis temperature of $Li_xMn_yB_{1-y}PO_4$ is lower than 300° C., it may be feared that neither the chemical reaction nor the crystallization proceeds sufficiently such that homogeneous $Li_xMn_yB_{1-y}PO_4$ cannot be produced. Moreover, if the synthesizing temperature for $Li_xMn_yB_{1-y}PO_4$ is higher than 790° C., it may be feared that crystallization proceeds excessively to render it impossible to suppress precipitation of impurities.

The non-aqueous electrolyte cell 1, employing $Li_xMn_yFe_{1-y}PO_4$ or $Li_xMn_yB_{1-y}PO_4$ as positive electrode active material, may, for example, be produced as follows:

Referring to FIG. 1, the non-aqueous electrolyte cell 1 includes a negative electrode 2, a negative electrode can 3, accommodating the negative electrode 2 therein, a positive electrode 4, a positive electrode can 5, accommodating the positive electrode 4 therein, a separator 6, arranged between the positive electrode 4 and the negative electrode 2, and an insulating gasket 7. A non-aqueous electrolytic solution is charged into the negative electrode can 3 and into the positive electrode can 5.

The negative electrode 2 includes a layer of a negative electrode active material, formed on a negative electrode current collector. The negative electrode current collector may, for example, be a nickel or copper foil.

Such a negative electrode active material is used which is able to dope/undope lithium. Specifically, metal lithium, lithium alloys, lithium-doped electrically conductive high molecular material, or a laminate compound, such as a carbon material or metal oxide, are used.

As a binder contained in the layer of the negative electrode active material, any suitable known resin material, routinely used as a binder for this sort of the non-aqueous electrolyte cell, may be used.

As the negative electrode, a metal lithium foil, for example, which proves a negative electrode active material, may also be used.

The negative electrode can 3, in which to hold the negative electrode 2, also serves as an external negative electrode for the non-aqueous electrolyte cell 1.

The positive electrode 4 includes a layer of the positive electrode active material, containing the positive electrode active material. This non-aqueous electrolyte cell 1 contains the aforementioned compound represented by the general formula $Li_xMn_yFe_{1-y}PO_4$ or $Li_xMn_yFe_{1-(y+z)}PO_4$ as the positive electrode active material. Moreover, the non-aqueous electrolyte cell 1 contains a compound represented by the general formula $Li_xMn_yB_{1-y}PO_4$, where $0<x\leq2$, $0<y<1$ and B is a metal element selected from among Ti, Zn, Mg and Co, or a compound represented by the general formula $Li_xMn_yB_{1-y}PO_4$, where $0<x\leq2$, $0<y<1$ and B is a metal element selected from among Ti, Fe, Zn, Mg and Co, as the positive electrode active material. As the positive electrode current collector, an aluminum foil, for example, may be used.

As a binder contained in the layer of the positive electrode active material, any suitable known binder for the layer of the positive electrode active material of this sort of the non-aqueous electrolyte cell, such as resin materials, may be used.

The positive electrode can 5 accommodates the positive electrode 4 therein, and serves as an external positive electrode for the non-aqueous electrolyte cell 1.

The separator 6, used for separating the positive electrode 4 and the negative electrode 2 from each other, may be formed of any suitable known material for use as the separator for this sort of the non-aqueous electrolyte cell, and may, for example, be a film of a high molecular material, such as polypropylene. In view of the relation between the lithium ion conductivity and the energy density, the separator must be as thin as possible. Specifically, the separator thickness may, for example, be not larger than 50 μm.

The insulating gasket 7, built into and unified to the negative electrode can 3, is used for preventing leakage of the non-aqueous electrolytic solution charged into the negative electrode can 3 and into the positive electrode can 5.

As the non-aqueous electrolytic solution, a solution obtained on dissolving an electrolyte in a non-protonic non-aqueous solvent is used.

Among the usable non-aqueous solvents, there are, for example, propylene carbonate, ethylene carbonate, butylene carbonate, vinylene carbonate, γ-butyrolactone, sulforane, 1,2-dimethoxyethane, 1,2-diethoxyethane, 2-methyltetrahydrofuran, 3-methyl 1,3-dioxolane, methyl propionate, methyl butyrate, dimethyl carbonate, diethyl carbonate and dipropyl carbonate. In view of voltage stability, cyclic carbonates, such as propylene carbonate or vinylene carbonate, or chained carbonates, such as dimethyl carbonate, diethyl carbonate or dipropyl carbonate, are preferred. These non-aqueous solvents may be used alone or in combination.

As the electrolyte to be dissolved in a non-aqueous solvent, lithium salts, such as, for example, $LiPF_6$, $LiClO_4$, $LiAsF_6$, $LiBF_4$, $LiCF_3SO_3$, $LiN(CF_3SO_2)_2$, may be used. Of these, lithium salts, $LiPF_6$ and $LiBF_4$ are preferred.

The non-aqueous electrolyte cell 1 contains a compound represented by $Li_xMn_yFe_{1-y}PO_4$ or a compound represented by $Li_xMn_yFe_{1-(y+z)}PO_4$, as the positive electrode active material. Since the proportion y of Mn in these compounds $Li_xMn_yFe_{1-y}PO_4$ or $Li_xMn_yFe_{1-(y+z)}PO_4$ is set to a range of $0.5<y<0.95$, a high discharge voltage is realized without lowering the discharge capacity. So, the non-aqueous electrolyte cell 1, employing $Li_xMn_yFe_{1-y}PO_4$ or $Li_xMn_yFe_{1-(y+z)}PO_4$ as the positive electrode active material, has a high discharge voltage in the vicinity of 4V, thus exhibiting superior charging/discharging characteristics. Since the capacity of the high voltage range in the vicinity of 4V is improved, the cell 1 is designed to be compatible with the current lithium cell.

There is also contained, as a positive electrode active material, a compound represented by the general formula $Li_xMn_yB_{1-y}PO_4$, where $0<x\leq2$, $0<y<1$ and B is an element selected from among Ti, Fe, Zn, Mg and Co, or a compound represented by the general formula $Li_xMn_yB_{1-y}PO_4$ where $0<x\leq2$, $0<y<1$ and B is a metal element selected from among Ti, Fe, Zn, Mg and Co. Since $Li_xMn_yB_{1-y}PO_4$ used as the positive electrode active material has a portion of Mn thereof replaced by a properly selected metal element B, this metal element B having a Yarn-Teller effect ascribable to $Mn^{3+}$, it is possible to suppress distortion of the crystal structure proper to $Li_xMn_yB_{1-y}PO_4$. In this manner, $Li_xMn_yB_{1-y}PO_4$ is able to realize generation of Mn by the redox reaction. Consequently, the non-aqueous electrolyte cell 1, employing $Li_xMn_yB_{1-y}PO_4$ as the positive electrode active material, has a high discharge capacity in the vicinity of 4V and hence superior charging/discharging characteristics.

The non-aqueous electrolyte cell 1, employing $Li_xMn_yB_{1-y}PO_4$ or $Li_xMn_yFe_{1-(y+z)}PO_4$ as the positive electrode active material, is prepared e.g., in the following manner.

As the negative electrode 2, a slurried negative electrode mixture is prepared by dispersing the negative electrode active material and the binder in a solvent. The resulting negative electrode mixture is coated uniformly on a current collector and dried in situ to form a layer of the negative electrode active material to prepare the negative electrode 2. As the binder for the negative electrode mixture, any suitable known binder may be used. In addition, the negative electrode mixture may be added to with known additives. The metal lithium as a negative electrode active material may also be used directly as the negative electrode 2.

In preparing the positive electrode 4, $Li_xMn_yFe_{1-y}PO_4$, $Li_xMn_yFe_zA_{1-(y+z)}PO_4$ or $Li_xMn_yB_{1-y}PO_4$, as a positive electrode active material, an electrification agent, such as graphite, and a binder, are dispersed in a solvent to prepare a slurried positive electrode mixture. The so-produced positive electrode mixture is evenly coated on the current collector and dried in situ to form a layer of the positive electrode active material to prepare the positive electrode 4. As the binder for the positive electrode mixture, any suitable known binder may be used. In addition, the positive electrode mixture may be added to with known additives.

The non-aqueous electrolytic solution is prepared by dissolving an electrolytic salt in a non-aqueous solvent.

The negative electrode 2 and the positive electrode 4 are housed in the negative electrode can 3 and in the positive electrode can 5, respectively, and the separator 6, formed by a polypropylene porous film, is arranged between the negative and positive electrodes 4. The non-aqueous solvent is poured into the negative and positive electrode cans 3, 5, which are then caulked and secured together via the insulating gasket 7 to complete the non-aqueous electrolyte cell 1.

The positive electrode active material contains a compound represented by the general formula $Li_xMn_yFe_{1-y}PO_4$ where $0<x\leq2$ and $0.5<x<0.95$, or a compound represented by the general formula $Li_xMn_yFe_zA_{1-(y+z)}PO_4$, where $0<x\leq2$, $0.5<x\leq0.95$ and $0.5<y+z<1$, A being at least one metal element selected from the group of Ti and Mg. Consequently, with this positive electrode active material, the Yarn-Teller effect, ascribable to $Mn^{3+}$, and produced when $Li_xMn_yFe_{1-y}PO_4$ or $Li_xMn_yFe_zA_{1-(y+z)}PO_4$ is in the charged state, is diluted. The result is that the distortion of the crystalline structure of $Li_xMn_yFe_{1-y}PO_4$ or $Li_xMn_yFe_zA_{1-(y+z)}PO_4$ is suppressed to render possible the generation of Mn by the redox reaction which it has been difficult to achieve with the Mn-based phosphoric acid compound having the olivinic structure. Since the proportion y of Mn is in a range of $0.5<y<0.95$, it becomes possible to realize a high discharge voltage as a high capacity is maintained.

The positive electrode active material contains a compound represented by the general formula $Li_xMn_yFe_{1-y}PO_4$ where $0<x\leq2$ and $0.5<x\leq0.95$, or a compound represented by the general formula $Li_xMn_yFe_zA_{1-(y+z)}PO_4$, where $0<x\leq2$, $0.5<x\leq0.95$ and $0.5<y+z<1$, A being at least one metal element selected from the group of Ti and Mg. Thus, with this non-aqueous electrolyte cell 1, a high discharge voltage in the vicinity of 4V is realized, as a high capacity is maintained, so that superior charging/discharging characteristics are displayed. Moreover, since the capacity in the high voltage range in the vicinity of 4V is improved, the cell 1 can be made compatible with the currently available lithium cell.

Moreover, the positive electrode active material contains a compound represented by the general formula $Li_xMn_yB_{1-y}PO_4$, where $0<x\leq2$ and $0<y<1$, with B being one metal element selected from among Ti, Zn, Mg and Co, or a compound represented by the general formula $Li_xMn_yB_{1-y}PO_4$, where $0<x\leq2$ and $0<y<1$, with B being one metal element selected from among Ti, Fe, Zn, Mg and Co. So, with this positive electrode active material, the Yarn-Teller effect ascribable to $Mn^{3+}$ in $Li_xMn_yB_{1-y}PO_4$ is diluted. The result is that the distortion of the crystalline structure of $Li_xMn_yFe_{1-y}PO_4$ or $Li_xMn_yFe_zA_{1-(y+z)}PO_4$ is suppressed to render possible the generation of Mn by the redox reaction which it has been difficult to achieve with the Mn-based phosphoric acid compound having the olivinic structure.

In the method for synthesizing the positive electrode active material, a method by a solid-phase reaction of mixing powders of a compound as a starting material for synthesis of $Li_xMn_yFe_{1-y}PO_4$ or $Li_xMn_yFe_zA_{1-(y+z)}PO_4$ and heating the resulting mixture has been explained. The present invention is, however, not limited to this particular embodiment. Specifically, a compound represented by the general formula $Li_xMn_yFe_{1-y}PO_4$ or $Li_xMn_yFe_zA_{1-(y+z)}PO_4$ may be synthesized using the solid phase reaction or by a variety of chemical synthesis methods other than the solid phase reaction.

Moreover, the non-aqueous electrolyte cell 1 contains, as the positive electrode active material, a compound represented by the general formula $Li_xMn_yB_{1-y}PO_4$, where $0<x\leq2$ and $0<y<1$, with B being one metal element selected from among Ti, Zn, Mg and Co, or a compound represented by the general formula $Li_xMn_yB_{1-y}PO_4$, where $0<x\leq2$ and $0<y<1$, with B being one metal element selected from among Ti, Fe, Zn, Mg and Co. This non-aqueous electrolyte cell 1, containing $Li_xMn_yB_{1-y}PO_4$ capable of generating Mn by a redox reaction, has a high discharge capacity and superior charging/discharging characteristics.

The non-aqueous electrolyte cell 1 of the present embodiment may be of any desired shape, such as a cylindrical-, squared-, coin- or the like shape, without any limitations, while it may be of any desired thickness, such as a thin- or a thick-type.

In the above-described embodiment, a non-aqueous electrolyte obtained on dissolving an electrolyte salt in a non-aqueous solvent is used as a non-aqueous electrolyte. The present invention is, however, not limited to this particular embodiment since it may be applied to the use of a solid electrolyte or a gelated solid electrolyte containing a solvent for swelling, while it may be applied both to the primary cell and to the secondary cell.

EXAMPLES

For checking upon the favorable effect of the present invention, $Li_xMn_yFe_{1-y}PO_4$ was synthesized and, using it as a positive electrode active material, a cell was prepared to evaluate its characteristics.

Example 1

First, $LiMn_{0.6}Fe_{0.4}PO_4$ was prepared as a positive electrode active material.

For synthesizing $LiMn_{0.6}Fe_{0.4}PO_4$, manganese carbonate $MnCO_3$, iron oxalate dihydride $FeC_2O_4\cdot2H_2O$, ammonium dihydrogen phosphate $NH_4H_2PO_4$ and lithium carbonate $Li_2CO_3$ were mixed together to a molar ratio of 1.2:0.8:2:1 and pulverized sufficiently in a ball mill for mixing. The resulting mixture then was calcined in a nitrogen atmosphere at 300° C. for three hours to prepare an intermediate synthesized product. This intermediate synthesized product was mixed with acetylene black to a weight ratio of 90:10 and pulverized sufficiently in a ball mill for mixing. The resulting mixture was heated in a nitrogen atmosphere for 25 hours at 450°, 500°, 600° or 700° C. to synthesize $LiMn_{0.6}Fe_{0.4}PO_4$.

A cell was prepared using the $LiMn_{0.6}Fe_{0.4}PO_4$, prepared as described above, as a positive electrode active material. It is noted that the cell was prepared using $LiMn_{0.6}Fe_{0.4}PO_4$ obtained on heating at 600° C.

85 wt % of dried $LiMn_{0.6}Fe_{0.4}PO_4$, as a positive electrode active material, 10 wt % of acetylene black, as an electrification agent, and 5 wt % of polyvinylidene fluoride, as a binder, were mixed uniformly in N-methyl-2-pyrrolidone, as a solvent, to prepare a paste-like positive electrode mixture. Meanwhile, #1300 manufactured by Aldrich Inc. was used as polyvinylidene fluoride.

This positive electrode mixture was coated on an aluminum mesh, as a current collector, and dried at 100° C. for one hour in an argon atmosphere to form a layer of a positive electrode active material.

The aluminum mesh, now carrying the layer of the positive electrode active material thereon, was punched to a disc shape 15 mm in diameter to form a pellet-like positive electrode. Meanwhile, 60 mg of the active material was carried by one positive electrode.

A foil of metal lithium then was punched to substantially the same shape as the positive electrode for use as a negative electrode.

Then, $LiPF_6$ was dissolved at a concentration of 1 mol/l in a solvent mixture containing propylene carbonate and dimethyl carbonate in an equal volume ratio to prepare a non-aqueous electrolytic solution.

The positive electrode, prepared as described above, was housed in the positive electrode can, while the negative electrode was housed in the negative electrode can 3, and separator was arranged between the positive and negative electrodes. The non-aqueous solvent is poured into the negative and positive electrode cans 3, 5, which were then caulked and secured together via the insulating gasket 7 to complete a 2025 type coin-shaped test cell.

Comparative Example 1

First, $LiMnPO_4$ was synthesized as a positive electrode active material.

For synthesizing $LiMnPO_4$, manganese carbonate $MnCO_3$, ammonium dihydrogen phosphate $NH_4H_2PO_4$ and lithium carbonate $Li_2CO_3$ were mixed together to a molar ratio of 2:2:1 and pulverized sufficiently in a ball mill for mixing. The resulting mixture then was calcined in a nitrogen atmosphere at 300° C. for three hours to prepare an intermediate synthesized product. This intermediate synthesized product was further pulverized sufficiently in a ball mill for mixing. The resulting mixture was heated in a nitrogen atmosphere at 600° C. for 24 hours to synthesize $LiMnPO_4$.

Using $LiMnPO_4$ as a positive electrode active material, a test cell was prepared in the same way as in Example 1.

A powder X-ray diffraction pattern was measured of each of $LiMn_{0.6}Fe_{0.4}PO_4$ of Example 1 and of $LiMnPO_4$ of Comparative Example 1, synthesized as described above, under the following conditions:

Device used: rotating anticathode Rigaku RINT2500

X-rays: CuKα, 40 kV, 100 mA goniometer: vertical type standard, 185 mm in radius counter monochrometer; used filter: not used slit width:
   divergent slit (DS)=1°
   receiving slit (RS)=1°
   scattering slit (SS)=0.15 mm counter: scintillation counter measurement method: reflection method, continuous scan scanning range: 2θ=10° to 80° scanning speed: 4°/min

Figure 2:
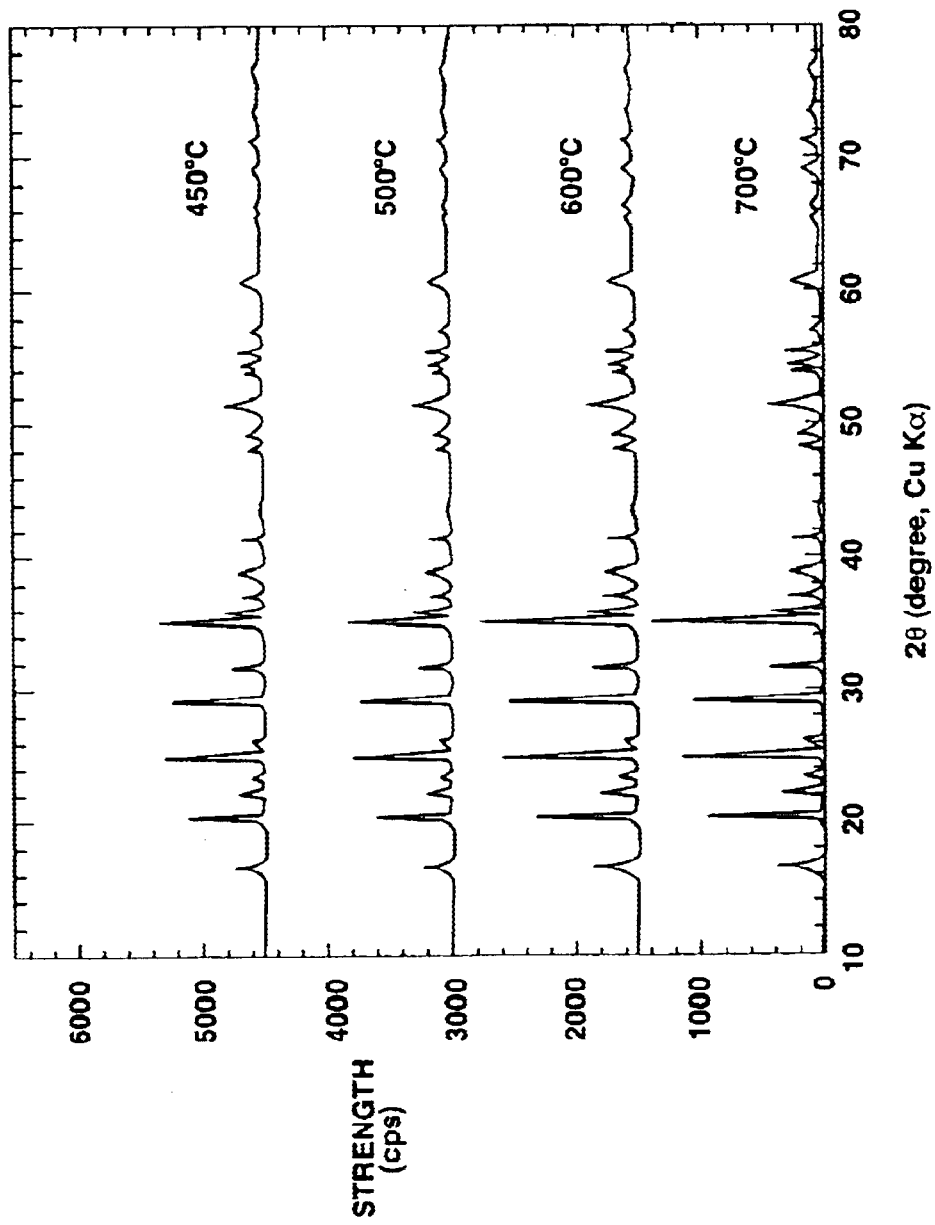
FIG. 2 shows a powder X-ray diffraction pattern of each of LiMn0.6Fe0.4PO4 heated and synthesized by heating at 450° C., 500° C., 600° C. or 700° C. in Example 1.

FIG. 2 shows respective X-ray diffraction patterns of $LiMn_{0.6}Fe_{0.4}PO_4$, synthesized in Example 1 on heating at 450°, 500°, 600° or 700° C. It is seen from FIG. 2 that no impurities other than $LiMn_{0.6}Fe_{0.4}PO_4$ are identified in the product such that $LiMn_{0.6}Fe_{0.4}PO_4$ having the single-phase olivinic structure has been produced.

Figure 3:
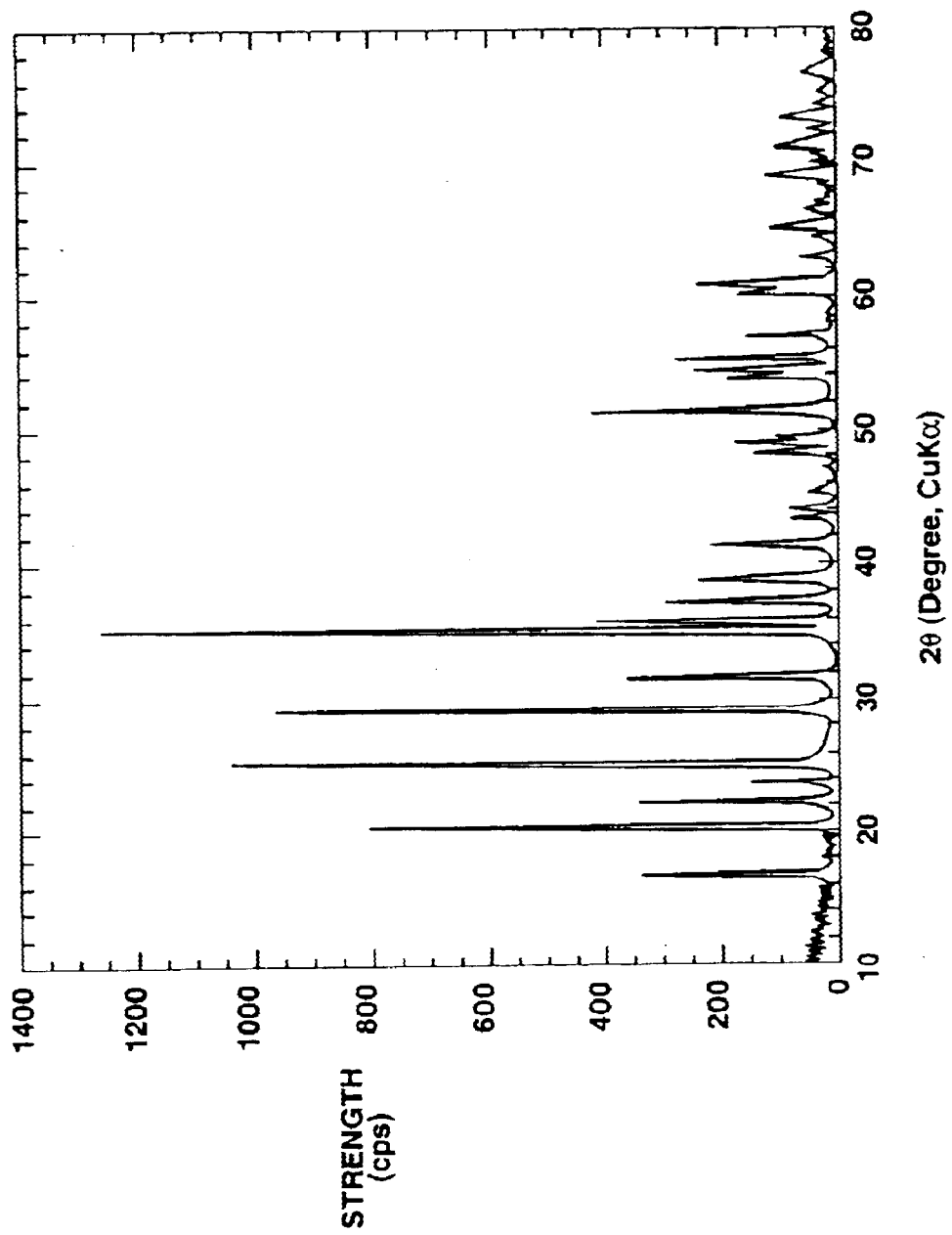
FIG. 3 shows a powder X-ray diffraction pattern of LiMnPO4 synthesized in Comparative Example 1.

FIG. 3 shows a powder X-ray diffraction pattern of $LiMnPO_4$ synthesized in Comparative Example 1. It is seen from FIG. 3 that a single-phase $LiMnPO_4$ has been produced.

A charging/discharging test was conducted on the test cell fabricated as described above.

The constant current charging was carried out on each test cell. At a time point when the cell voltage reached 4.5V, constant current charging was switched to constant voltage charging and charging was carried out as the voltage of 4.5V was maintained. The charging was finished at a time point the current reached a value not larger than 0.05 mA/cm². The discharging then was carried out at a time point when the cell voltage was lowered to 2.0 V. Meanwhile, charging and discharging were carried our at an ambient temperature of 23° C.

Figure 4:
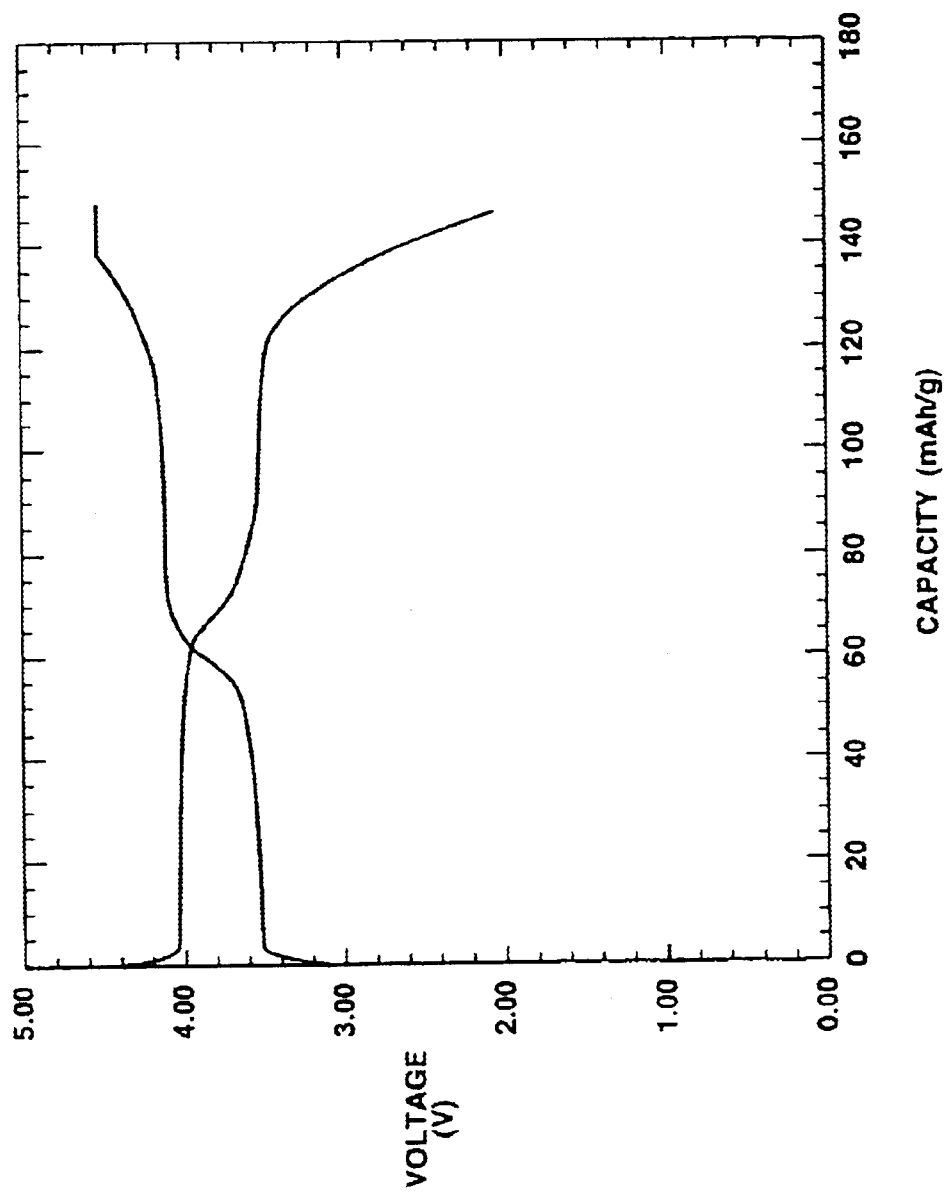
FIG. 4 shows charging/discharging characteristics of a cell which uses LuMn0.6Fe0.4PO4, synthesized at 600° C. in Example 1.
Figure 5:
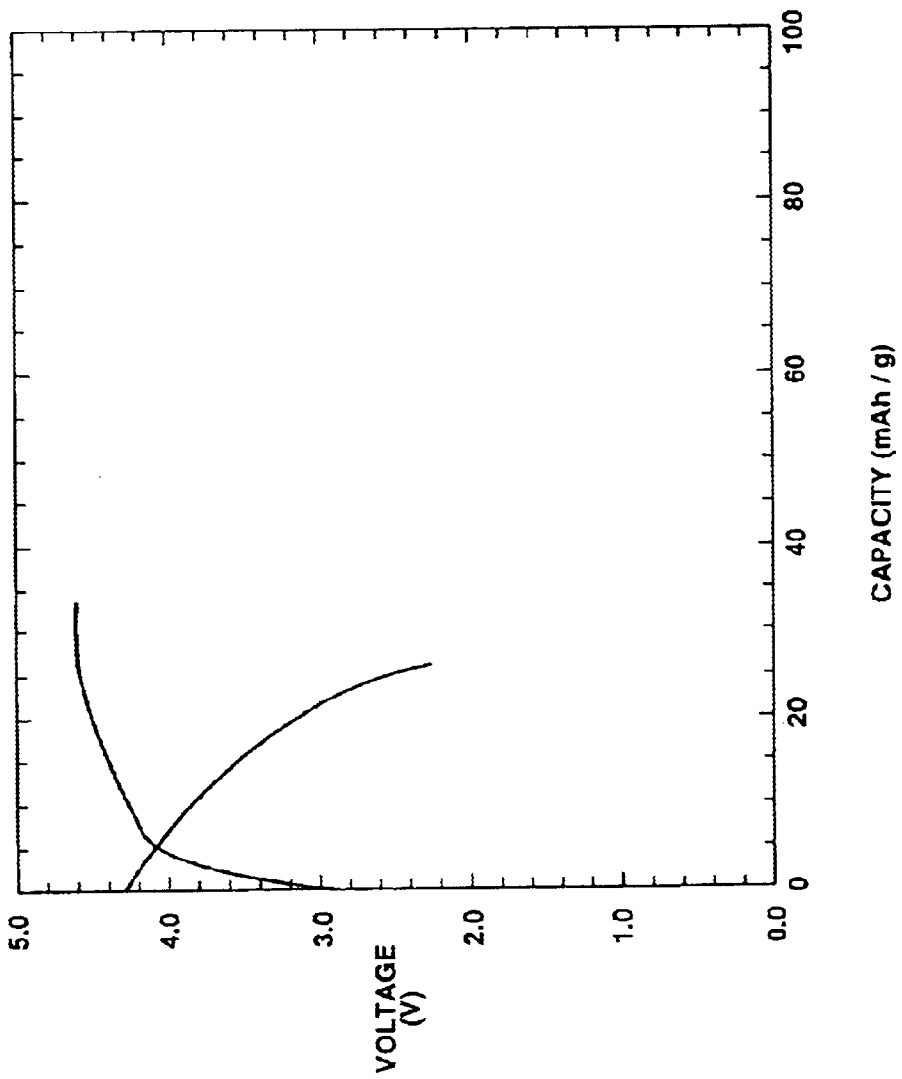
FIG. 5 shows charging/discharging characteristics of a cell which uses LiMnPO4, synthesized in Comparative Example 1.

FIG. 4 shows charging/discharging characteristics of a cell, which uses $LiMn_{0.6}Fe_{0.4}PO_4$, synthesized on heating at 600° C., as a positive electrode active material. FIG. 5 shows charging/discharging characteristics of a cell which uses $LiMnPO_4$ synthesized in Comparative Example 1 as a positive electrode active material.

As may be seen from FIG. 4, the cell which uses $LiMn_{0.6}Fe_{0.4}PO_4$ as the positive electrode active material has flat potentials in the vicinity of 4V and 3.4V in the former and latter halves of a discharging area to generate the reversible charging/discharging capacity of approximately 146 mAh/g. It is also seen from FIG. 5 that, although single-phase $LiMnPO_4$ having the olivinic structure is used as the positive electrode active material, this cell is not provided with a flat discharging area such that no Mn is generated by the redox reaction. It is seen from above that $LiMn_{0.6}Fe_{0.4}PO_4$, in which Fe has been substituted for part of Mn, and Mn is generated by the redox reaction, can be used as the positive electrode active material having a high discharge voltage and a high capacity.

Next, $Li_xMn_yFe_{1-y}PO_4$, with an increased proportion y of Mn, was synthesized. Using the $Li_xMn_yFe_{1-y}PO_4$, thus produced, a cell was prepared to evaluate its characteristics.

Example 2

First, $LiMn_{0.7}Fe_{0.3}PO_4$, was prepared as the positive electrode active material.

For synthesizing $LiMn_{0.7}Fe_{0.3}PO_4$, manganese carbonate $MnCO_3$, iron oxalate dihydride $FeC_2O_4 \cdot 2H_2O$, ammonium dihydrogen phosphate $NH_4H_2PO_4$ and lithium carbonate $Li_2CO_3$ were mixed together to a molar ratio of 1.4:0.6:2:1 and pulverized sufficiently in a ball mill for mixing. The resulting mixture then was calcined in a nitrogen atmosphere at 300° C. for three hours to prepare an intermediate synthesized product. This intermediate synthesized product was mixed with acetylene black to a weight ratio of 90:10 and pulverized sufficiently in a ball mill for mixing. The resulting mixture was heated in a nitrogen atmosphere for 24 hours at 600° C. to synthesize $LiMn_{0.7}Fe_{0.3}PO_4$.

A cell was prepared using the $LiMn_{0.7}Fe_{0.3}PO_4$, prepared as described above, as a positive electrode active material.

Example 3

First, $LiMn_{0.75}Fe_{0.25}PO_4$, was prepared as the positive electrode active material.

For synthesizing $LiMn_{0.75}Fe_{0.25}PO_4$, manganese carbonate $MnCO_3$, iron oxalate dihydride $FeC_2O_4 \cdot 2H_2O$, ammonium dihydrogen phosphate $NH_4H_2PO_4$ and lithium carbonate $Li_2CO_3$ were mixed together to a molar ratio of 1.5:0.5:2:1 and pulverized sufficiently in a ball mill for mixing. The resulting mixture then was calcined in a nitrogen atmosphere at 300° C. for three hours to prepare an intermediate synthesized product. This intermediate synthesized product was mixed with acetylene black to a weight ratio of 90:10 and pulverized sufficiently in a ball mill for mixing. The resulting mixture was heated in a nitrogen atmosphere for 24 hours at 600° C. to synthesize $LiMn_{0.75}Fe_{0.25}PO_4$.

A cell was prepared using the $LiMn_{0.75}Fe_{0.25}PO_4$, prepared as described above, as a positive electrode active material.

Of $LiMn_{0.7}Fe_{0.3}PO_4$ and $LiMn_{0.75}Fe_{0.25}PO_4$ of Examples 2, 3, synthesized by the above-described method, powder X-ray diffraction patterns were measured under the same measurement conditions as those of Example 1. The powder X-ray diffraction patterns of $LiMn_{0.7}Fe_{0.3}PO_4$ of Example 2 and $LiMn_{0.75}Fe_{0.25}PO_4$ of Example 3 are shown together in FIG. 6.

Figure 7:
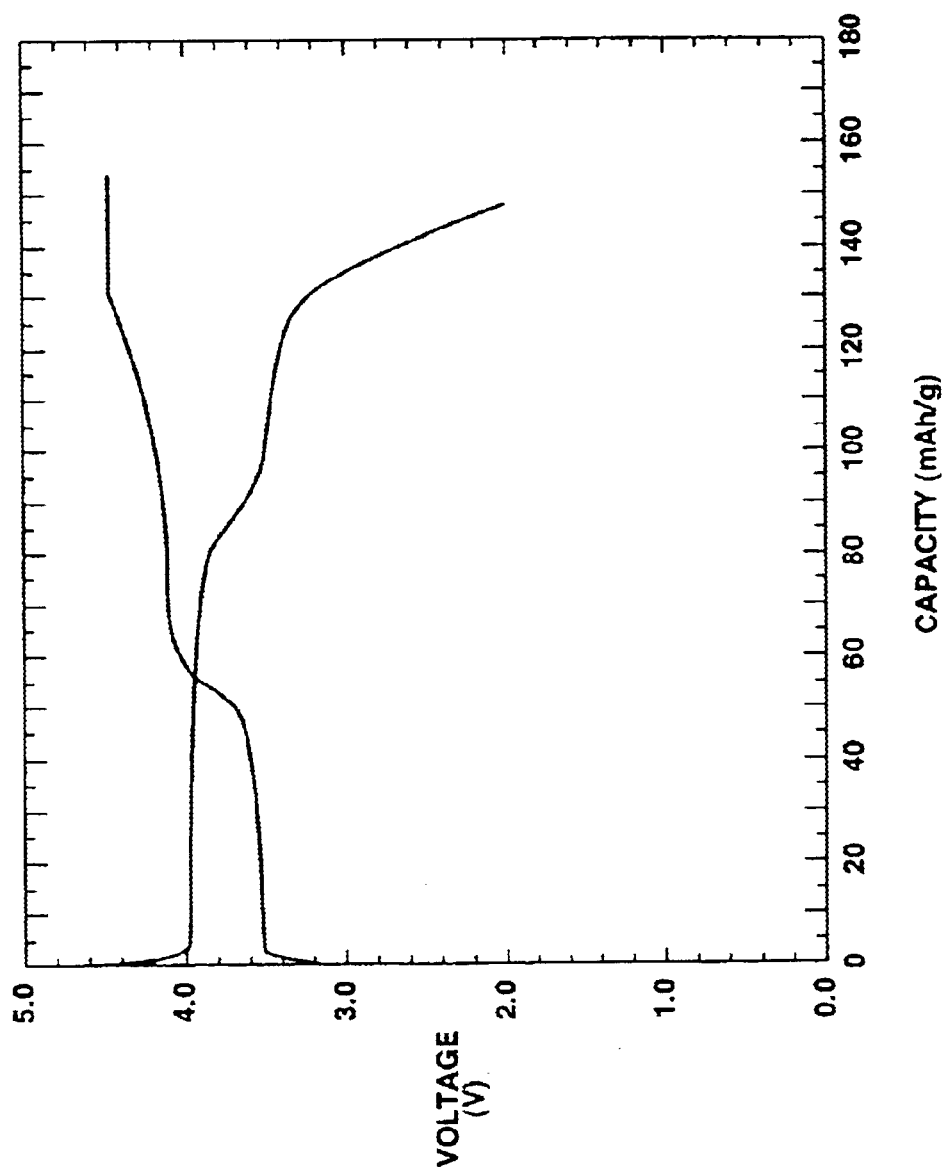
FIG. 7 shows charging/discharging characteristics of a cell which uses $LiMn_{0.7}Fe_{0.3}PO_4$, synthesized in Example 2, as a positive electrode active material.
Figure 8:
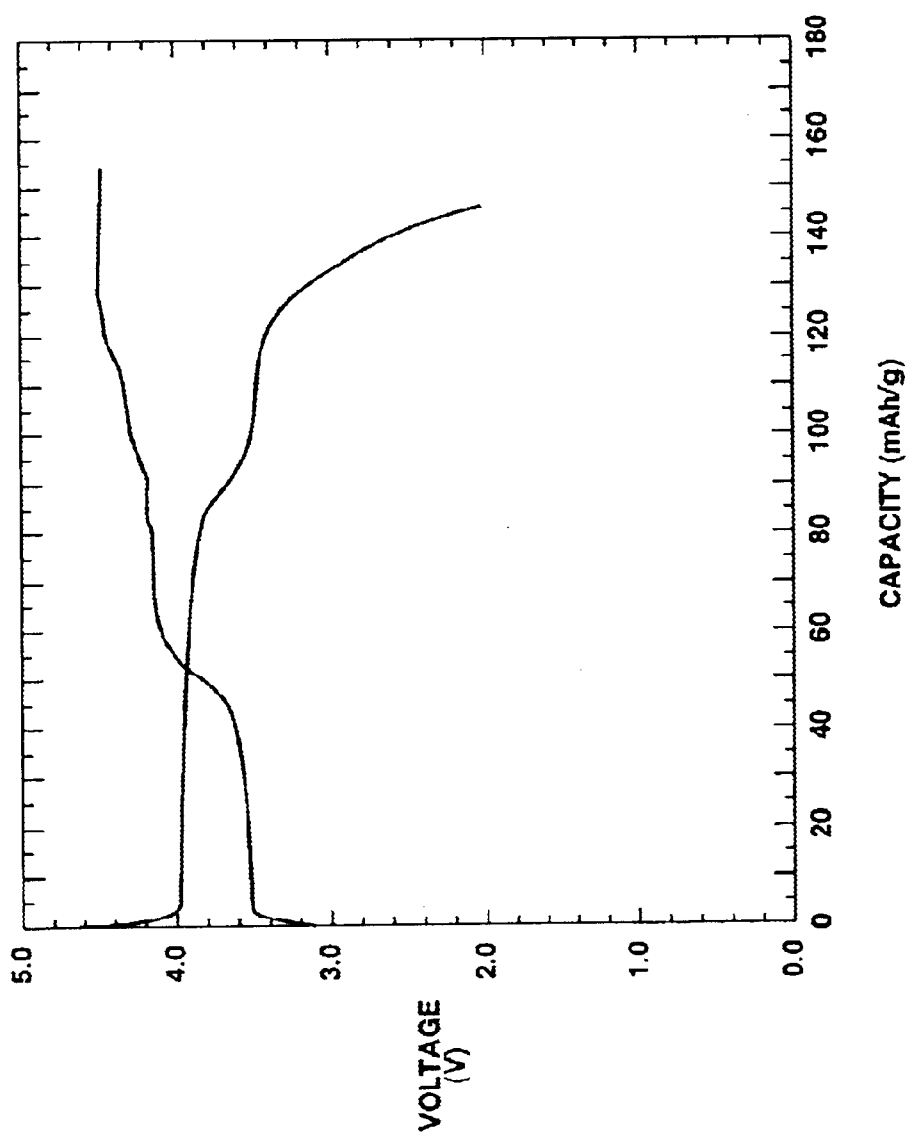
FIG. 8 shows charging/discharging characteristics of a cell which uses $LiMn_{0.75}Fe_{0.25}PO_4$, synthesized in Example 3, as a positive electrode active material.

A charging/discharging test was conducted on the test cells, thus prepared, in the same way as in Example 1. FIG. 7 shows charging/discharging characteristics of a cell which uses $LiMn_{0.7}Fe_{0.3}PO_4$ of Example 2 as the positive electrode active material. Similarly, FIG. 8 shows charging/discharging characteristics of a cell which uses $LiMn_{0.75}Fe_{0.25}PO_4$ of Example 3 as the positive electrode active material.

Figure 9:
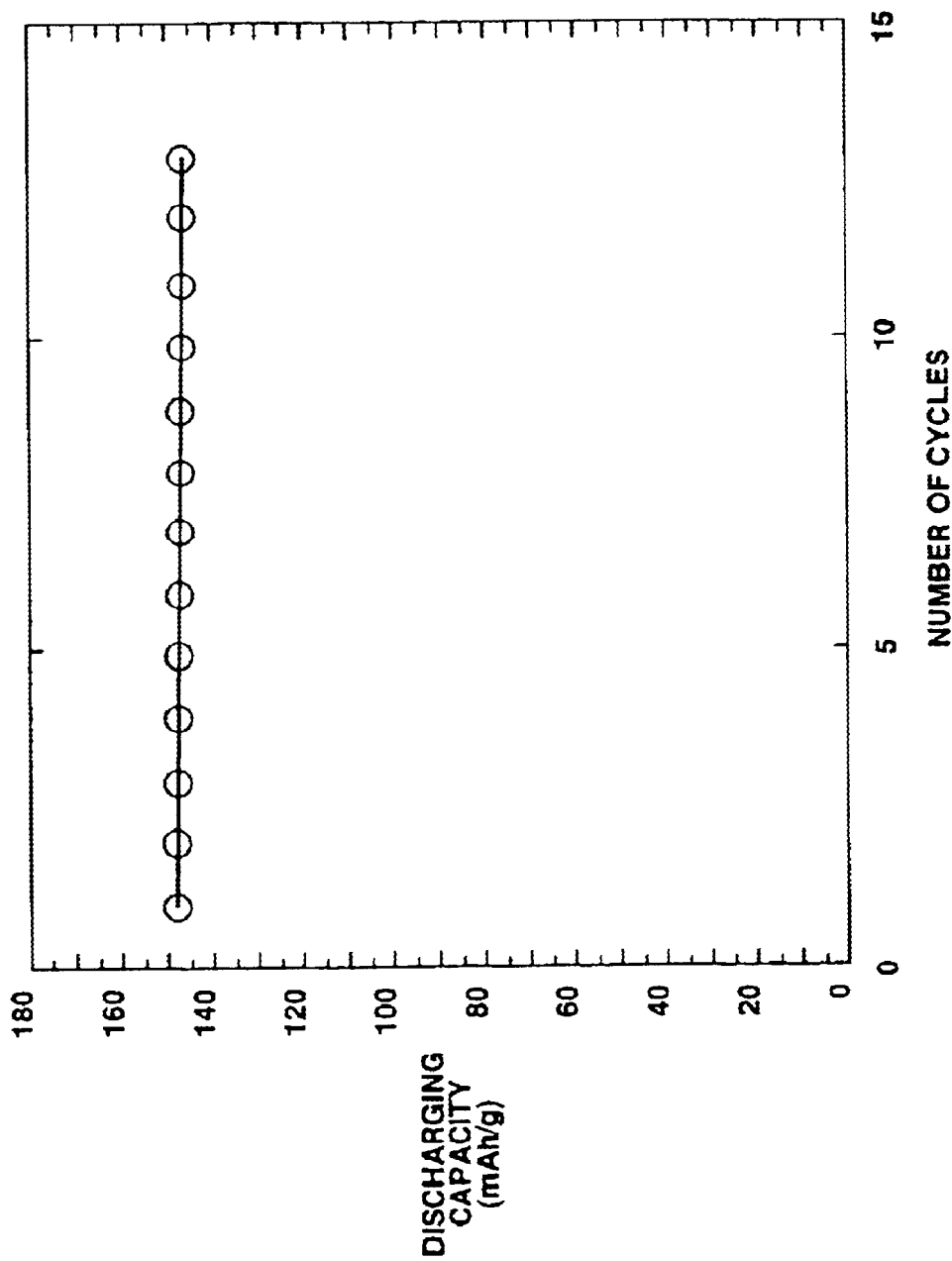
FIG. 9 shows charging/discharging characteristics of a cell which uses $LiMn_{0.7}Fe_{0.3}PO_4$, synthesized in Example 2, as a positive electrode active material.

On the cell which uses $LiMn_{0.7}Fe_{0.3}PO_4$ of Example 2 as the positive electrode active material, a charging/discharging test was carried out. FIG. 9 shows cyclic characteristics of the cell of Example 2.

Figure 6:
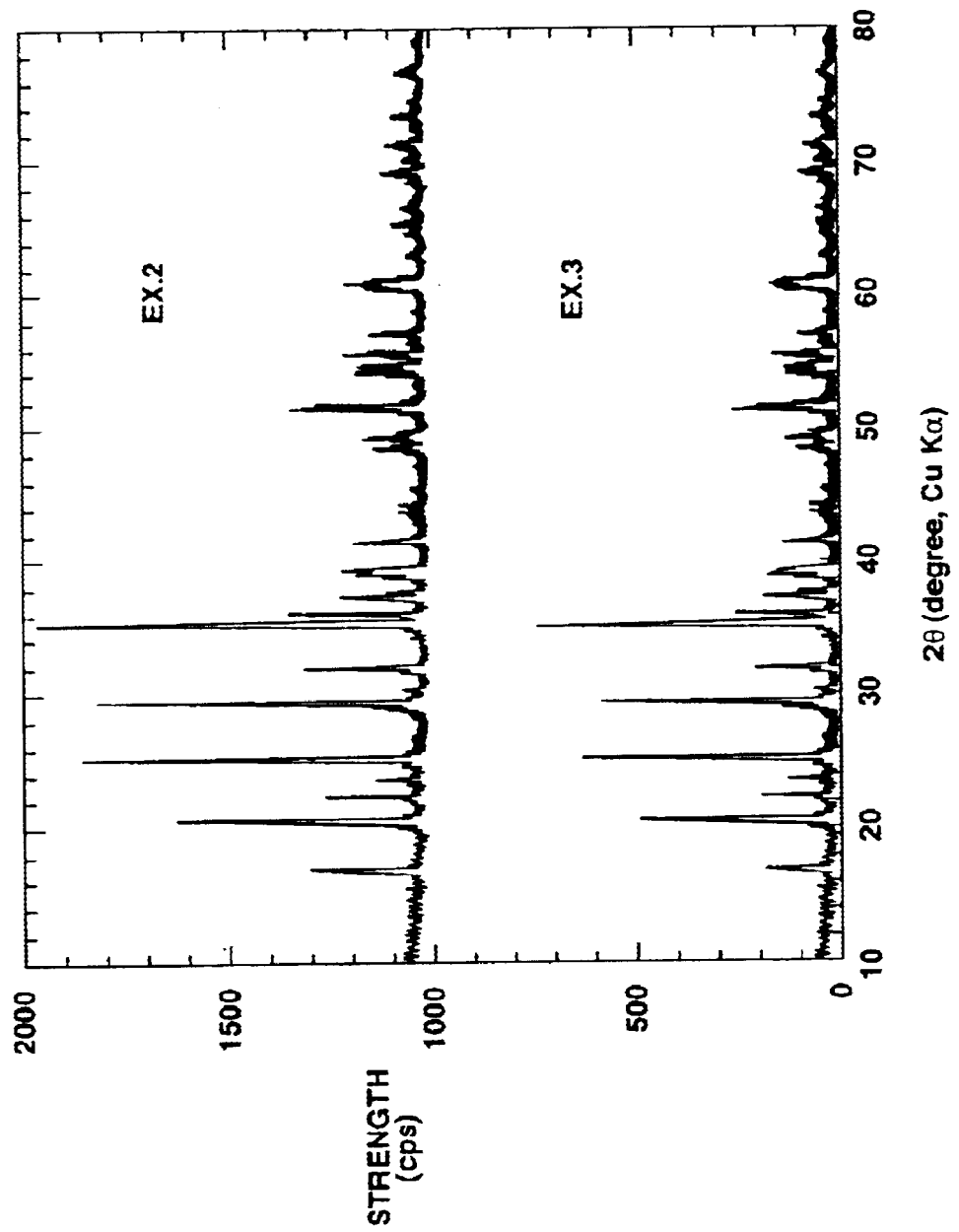
FIG. 6 shows charging/discharging characteristics of a cell which uses $LiMn_{0.7}Fe_{0.3}PO_4$, synthesized in Example 2, and LiMn0.75Fe0.25PO4, synthesized in Example 3.

As may be seen from FIG. 6, there are actually obtained $LiMn_{0.7}Fe_{0.3}PO_4$ and $LiMn_{0.75}Fe_{0.25}PO_4$ of the single-phase olivinic structure.

As may be seen from FIG. 7, with the cell which uses $LiMn_{0.7}Fe_{0.3}PO_4$ of Example 2 as the positive electrode active material, the flat discharge area in the vicinity of 4V has been enlarged as compared to the cell which uses $LiMn_{0.6}Fe_{0.4}PO_4$ shown in FIG. 4, such that a reversible charging/discharging capacity of approximately 146 mAh/g is produced. Moreover, as may be seen from FIG. 8, with the cell which uses $LiMn_{0.75}Fe_{0.25}PO_4$ as the positive electrode active material, the flat discharge area in the vicinity of 4V has been enlarged as compared to the cell which uses $LiMn_{0.7}Fe_{0.3}PO_4$ shown in FIG. 7, such that a reversible charging/discharging capacity of approximately 146 mAh/g is produced. It may be seen from this that, the larger the value of the proportion y of Mn, that is the more the proportion of Mn is increased with respect to Fe, a higher discharge voltage may be realized. It is also seen that, even if the proportion y of Mn is increased, the capacity is not lowered.

It is also seen from FIG. 9 that the cell which used $LiMn_{0.7}Fe_{0.3}PO_4$ of Example 3 as the positive electrode active material maintains the discharging capacity of approximately 146 mAh/g even on repeated charging/discharging operations thus testifying to satisfactory cyclic characteristics.

Then, $Li_xMn_yFe_zA_{1-(y+z)}PO_4$, corresponding to $Li_xMn_yFe_{1-y}PO_4$ Mn and Fe of which have been partially replaced with Fe and with at least one metal element A selected from among Ti and Mg, used in combination with Fe, was synthesized. A cell was prepared, using the so-obtained $Li_xMn_yFe_zA_{1-(y+z)}PO_4$ as the positive electrode active material, to evaluate its characteristics.

Example 4

First, $LiMn_{0.7}Fe_{0.2}Ti_{0.1}PO_4$ was prepared as a positive electrode active material.

For synthesizing $LiMn_{0.7}Fe_{0.2}Ti_{0.1}PO_4$, manganese carbonate $MnCO_3$, iron oxalate dihydride $FeC_2O_4 \cdot 2H_2O$, titanium oxide $TiO_2$, ammonium dihydrogen phosphate $NH_4H_2PO_4$ and lithium carbonate $Li_2CO_3$ were mixed together to a molar ratio of 1.4:0.4:0.2:2:1 and pulverized sufficiently in a ball mill for mixing. The resulting mixture then was calcined in a nitrogen atmosphere at 300° C. for three hours to prepare an intermediate synthesized product. This intermediate synthesized product was further pulverized sufficiently in a ball mill for mixing. The resulting mixture was heated in a nitrogen atmosphere for 24 hours at 600° C. to synthesize $LiMn_{0.7}Fe_{0.2}Ti_{0.1}PO_4$.

A test cell was prepared using the $LiMn_{0.7}Fe_{0.2}Ti_{0.1}PO_4$, prepared as described above, as a positive electrode active material.

Figure 10:
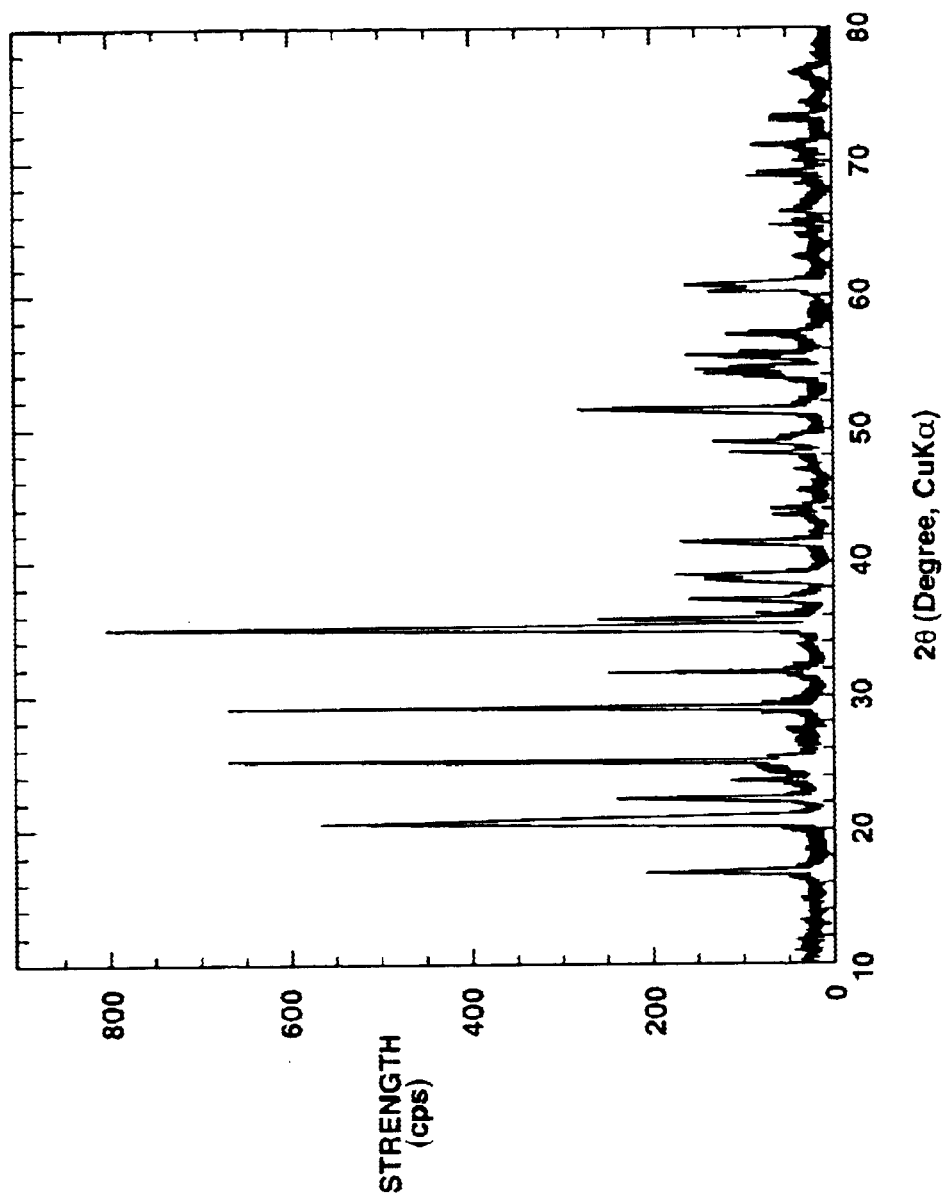
FIG. 10 shows a powder X-ray diffraction pattern of $LiMn_{0.7}Fe_{0.2}Ti_{0.1}PO_4$, synthesized in Example 4, as a positive electrode active material.
Figure 11:
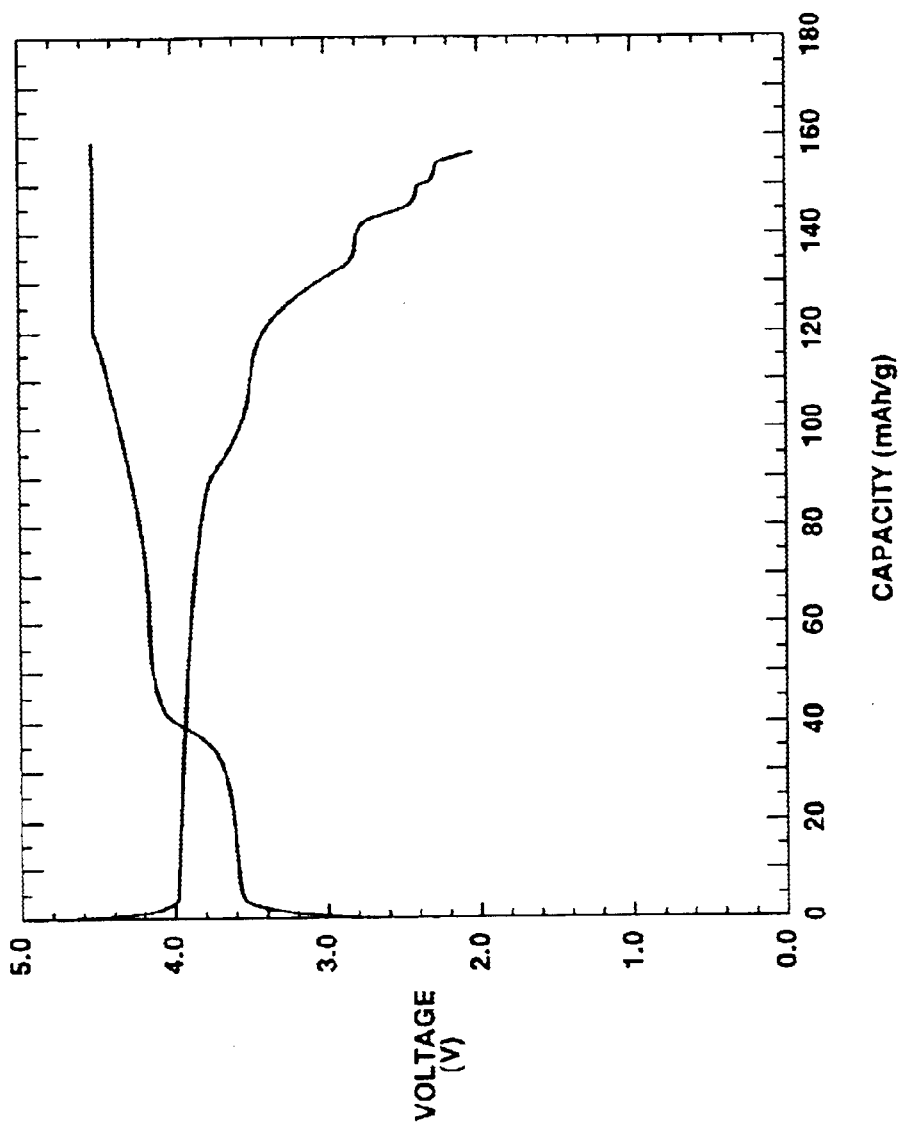
FIG. 11 shows charging/discharging characteristics of a cell which uses $LiMn_{0.7}Fe_{0.2}Ti_{0.1}PO_4$, synthesized in Example 4, as a positive electrode active material.

A powder X-ray diffraction pattern was measured of $LiMn_{0.7}Fe_{0.2}Ti_{0.1}PO_4$ of Example 4 synthesized by the above-described method under the same measurement conditions as those of Example 1. The powder X-ray diffraction pattern of $LiMn_{0.7}Fe_{0.2}Ti_{0.1}PO_4$ is shown in FIG. 10. A charging/discharging test was conducted on the test cell, thus prepared, in the same way as in Example 1. FIG. 11 shows charging/discharging characteristics of a cell which uses $LiMn_{0.7}Fe_{0.2}Ti_{0.1}PO_4$ as the positive electrode active material.

As apparent from FIG. 10, it is $LiMn_{0.7}Fe_{0.2}Ti_{0.1}PO_4$ having the single-phase olivinic structure that has been produced. As may be seen from FIG. 11, the cell which uses this $LiMn_{0.7}Fe_{0.2}Ti_{0.1}PO_4$ as the positive electrode active material has a flat potential in the vicinity of 4V. From this it is seen that $LiMn_{0.7}Fe_{0.2}Ti_{0.1}PO_4$, Mn and Fe of which have been replaced by Ti, realizes redox generation of Mn and can be used as a positive electrode active material having a high discharging potential.

It has also been seen that, by substituting Fe and Ti for Mn, a high discharge capacity on the order of 155 mAh/g may be achieved.

Example 5

First, $LiMn_{0.7}Fe_{0.25}Mg_{0.05}PO_4$ was synthesized as a positive electrode active material.

For synthesizing $LiMn_{0.7}Fe_{0.25}Mg_{0.05}PO_4$, manganese carbonate $MnCO_3$, iron oxalate dihydride $FeC_2O_4 \cdot 2H_2O$, magnesium oxalate $(MgC_2O_4 \cdot 2H_2O)$, ammonium dihydrogen phosphate $NH_4H_2PO_4$ and lithium carbonate $Li_2CO_3$ were mixed together to a molar ratio of 1.4:0.5:0.1:2:1 and pulverized sufficiently in a ball mill for mixing. The resulting mixture then was calcined in a nitrogen atmosphere at 300° C. for three hours to prepare an intermediate synthesized product. This intermediate synthesized product was further pulverized sufficiently in a ball mill for mixing. The resulting mixture was heated in a nitrogen atmosphere for 24 hours at 600° C. to synthesize $LiMn_{0.7}Fe_{0.25}Mg_{0.05}PO_4$.

A test cell was prepared using the $LiMn_{0.7}Fe_{0.25}Mg_{0.05}PO_4$, prepared as described above, as a positive electrode active material.

Figure 12:
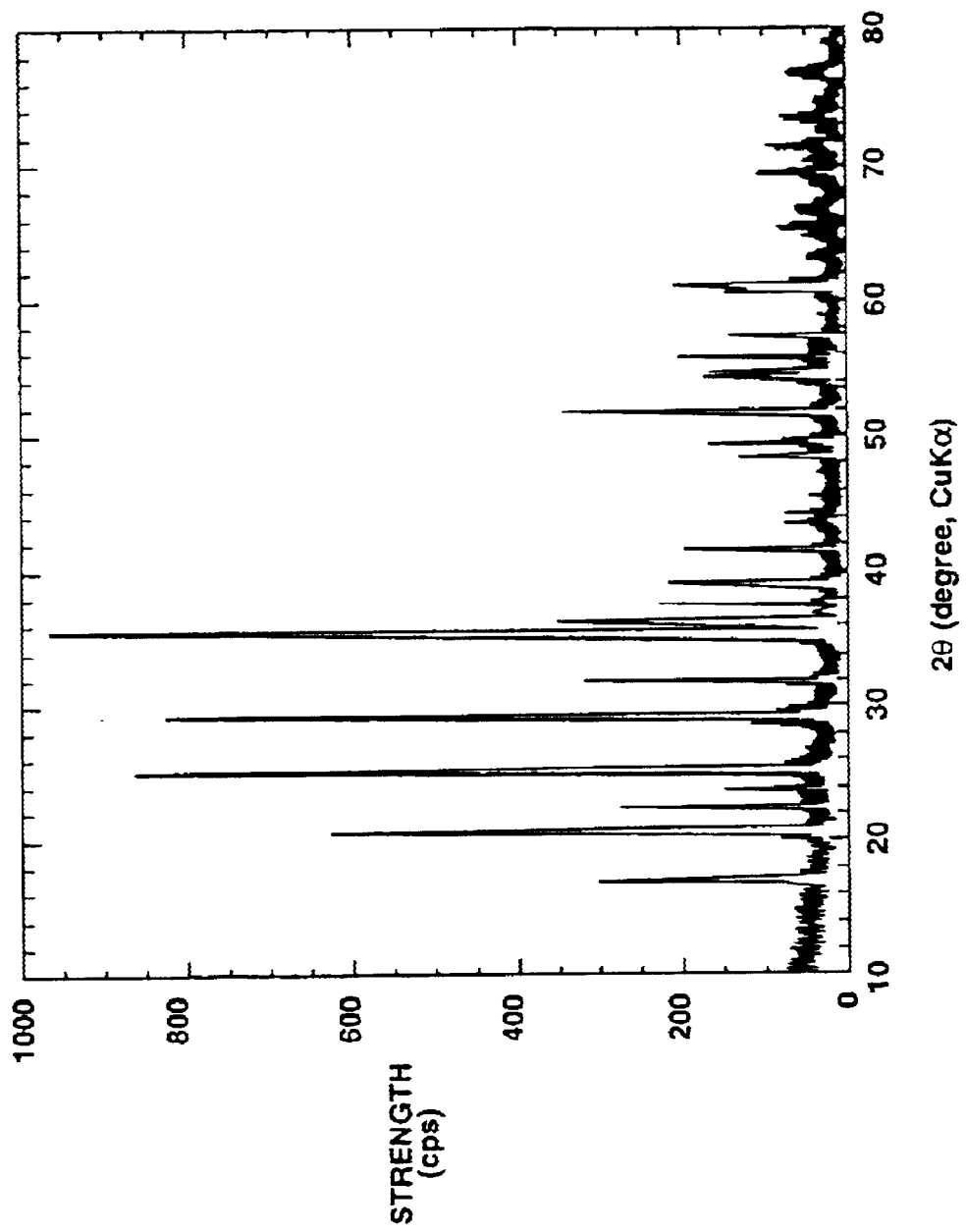
FIG. 12 shows a powder X-ray diffraction pattern of $LiMn_{0.7}Fe_{0.25}Ti_{0.05}PO_4$ synthesized in Example 5.
Figure 13:
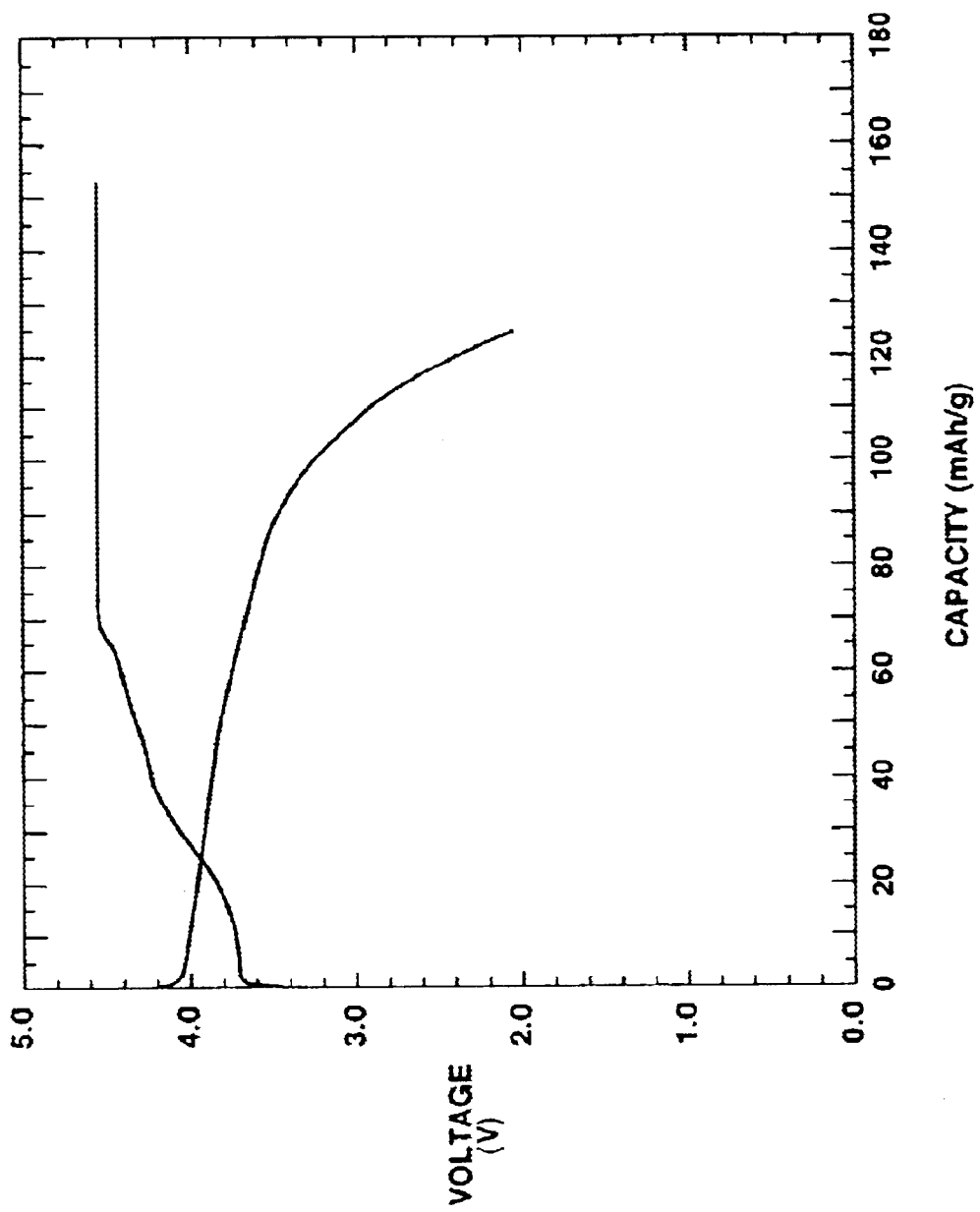
FIG. 13 shows charging/discharging characteristics of a cell which uses $LiMn_{0.7}Fe_{0.25}Ti_{0.05}PO_4$, synthesized in Example 5, as a positive electrode active material.

A powder X-ray diffraction pattern was measured of $LiMn_{0.7}Fe_{0.25}Mg_{0.05}PO_4$ of Example 5 synthesized by the above-described method, under the same measurement conditions as those of Example 1. The powder X-ray diffraction pattern of $LiMn_{0.7}Fe_{0.25}Mg_{0.05}PO_4$ is shown in FIG. 12. A charging/discharging test was conducted on the test cell, thus prepared, in the same way as in Example 1. FIG. 13 shows charging/discharging characteristics of a cell which uses $LiMn_{0.7}Fe_{0.25}Mg_{0.05}PO_4$ as the positive electrode active material.

As apparent from FIG. 12, it is $LiMn_{0.7}Fe_{0.25}Mg_{0.05}PO_4$, having the single-phase olivinic structure, that has been produced. As apparent from FIG. 13, the cell prepared using this $LiMn_{0.7}Fe_{0.25}Mg_{0.05}PO_4$ as the positive electrode active material has a flat potential in the vicinity of 4V. It may be seen from thus that $LiMn_{0.7}Fe_{0.25}Mg_{0.05}PO_4$, obtained on replacing part of Mn and Fe with Mg, is able to realize Mn generation by a redox reaction and hence may be used as a positive electrode active material having a high discharge voltage.

It has also been seen that, by replacing Mn with Fe and Mg, a discharge voltage may be realized which is higher than the discharging capacity obtained in Example 2 in which Mg alone is substituted for Mn.

In order to check upon the favorable effect of the present invention, $Li_xMn_yB_{1-y}PO_4$ was synthesized. Using $Li_xMn_yB_{1-y}PO_4$ as a positive electrode active material, a cell was prepared to check upon its characteristics.

In the Example 6 and Comparative Example 2, shown below, the effect of substituting Ti for part of Mn of $LiMnPO_4$, was checked.

Example 6

First, $LiMn_{0.8}Ti_{0.2}PO_4$ was synthesized.

For synthesizing $LiMn_{0.8}Ti_{0.2}PO_4$, titanium oxide $TiO_2$, manganese carbonate $MnCO_3$, ammonium dihydrogen phosphate $NH_4H_2PO_4$ and lithium carbonate $Li_2CO_3$ were mixed together to a molar ratio of 0.4:1.6:2:1 and pulverized sufficiently in a ball mill for mixing. The resulting mixture then was calcined in a nitrogen atmosphere at 300° C. for three hours to prepare an intermediate synthesized product. This intermediate synthesized product was further pulverized sufficiently in a ball mill for mixing. The resulting mixture was heated in a nitrogen atmosphere for 24 hours at 600° C. to synthesize $LiMn_{0.8}Ti_{0.2}PO_4$.

A cell was prepared using so-prepared $LiMn_{0.8}Ti_{0.2}PO_4$ as a positive electrode active material. It is noted that the cell was prepared using $LiMn_{0.8}Ti_{0.2}PO_4$ obtained by heating at 600° C.

First, a paste-like positive electrode mixture was prepared by homogeneously mixing 85 wt % of dried $LiMn_{0.8}Ti_{0.2}PO_4$, 10 wt % of acetylene black, as an electrification agent, and 5 wt % of polyvinylidene fluoride, as a binder, in N-methyl-2-pyrrolidone, as a solvent. Meanwhile, #1300 manufactured by Aldrich Inc. was used as polyvinylidene fluoride.

This positive electrode mixture was coated on an aluminum mesh, operating as a current collector, and was dried in a dry argon atmosphere at 100° C. for one hour to form a layer of the positive electrode active material.

The aluminum mesh, now carrying the layer of the positive electrode active material, was punched to a disc shape 15 mm in diameter to form a pellet-like positive electrode. Meanwhile, 60 mg of the active material was carried by one positive electrode.

A foil of metal lithium then was punched to substantially the same shape as the positive electrode to form a negative electrode.

Then, $LiPF_6$ was dissolved at a concentration of 1 mol/l in a solvent mixture containing propylene carbonate and dimethyl carbonate in an equal volume ratio to prepare a non-aqueous electrolytic solution.

The positive electrode, prepared as described above, was housed in the positive electrode can, while the negative electrode was housed in the negative electrode can, and a separator was arranged between the positive and negative electrodes. The non-aqueous solvent was poured into the negative and positive electrode cans, which were then caulked and secured together to complete a 2025 type coin-shaped test cell.

Comparative Example 2

First, $LiMnPO_4$ was synthesized as a positive electrode active material.

For synthesizing $LiMnPO_4$, manganese carbonate $MnCO_3$, ammonium dihydrogen phosphate $NH_4H_2PO_4$ and lithium carbonate $Li_2CO_3$ were mixed together to a molar ratio of 2:2:1 and pulverized sufficiently in a ball mill for mixing. The resulting mixture then was calcined in a nitrogen atmosphere at 300° C. for three hours to prepare an intermediate synthesized product. This intermediate synthesized product was further pulverized sufficiently in a ball mill for mixing. The resulting mixture was heated in a nitrogen atmosphere at 600° C. for 24 hours to synthesize $LiMnPO_4$.

Using $LiMnPO_4$ as a positive electrode active material, a test cell was prepared in the same way as in Example 6.

Of $LiMn_{0.8}Fe_{0.2}PO_4$ of Example 6, and of $LiMnPO_4$ of Comparative Example 2, synthesized as described above, powder X-ray diffraction patterns were measured under the following conditions:

Device used: rotating anticathode Rigaku RINT2500

X-rays: CuKα, 40 kV, 100 mA goniometer: vertical type standard, 185 mm in radius counter monochrometer; used filter: not used slit width:
    divergent slit (DS)=1°
    receiving slit (RS)=1°
    scattering slit (SS)=0.15 mm counter: scintillation counter measurement method: reflection method, continuous scan scanning range: 2θ=10° to 80° scanning speed: 4°/min

Figure 14:
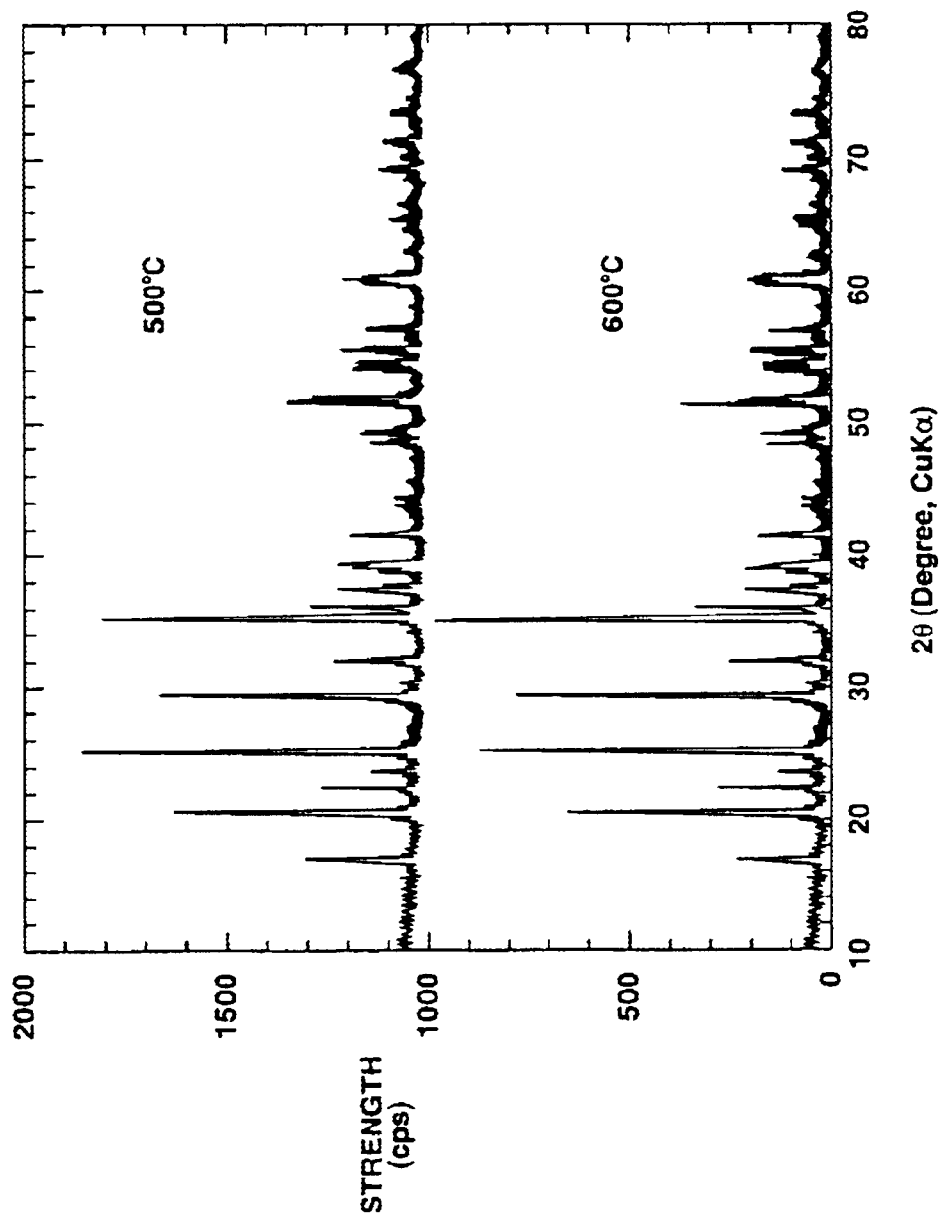
FIG. 14 shows a powder X-ray diffraction pattern of $LiMn_{0.8}Ti_{0.2}PO_4$, synthesized at 500° and 600° C., in Example 6.

FIG. 14 shows respective X-ray diffraction patterns of $LiMn_{0.8}Fe_{0.2}PO_4$, synthesized in Example 1 on heating at 500° and 600° C. It is seen from FIG. 2 that no impurities other than $LiMn_{0.8}Fe_{0.2}PO_4$ have been identified in the product such that $LiMn_{0.8}Fe_{0.2}PO_4$ having the single-phase olivinic structure has been obtained.

Figure 15:
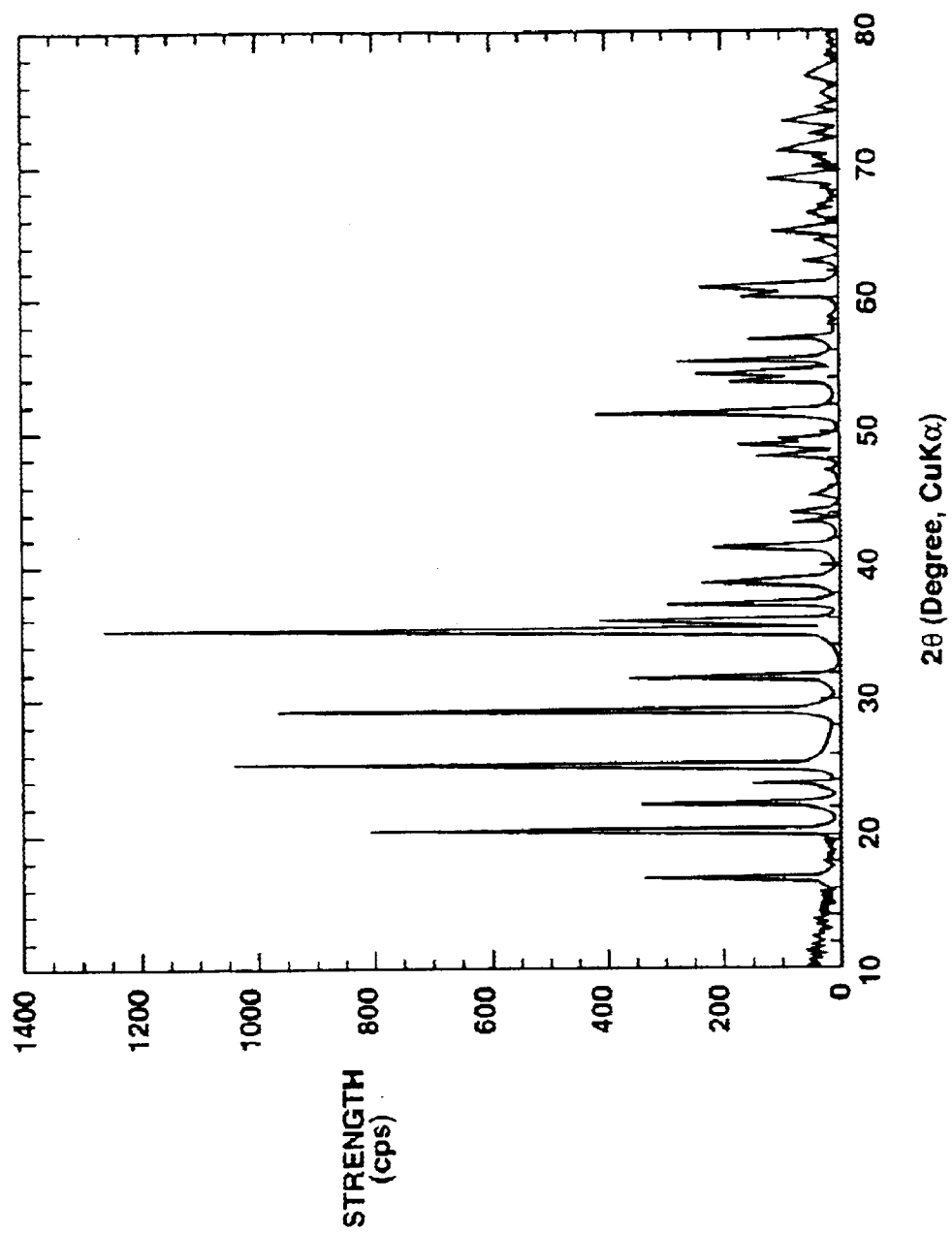
FIG. 15 shows a powder X-ray diffraction pattern of $LiMnPO_4$, synthesized in Comparative Example 2.

FIG. 15 shows a powder X-ray diffraction pattern of $LiMnPO_4$ synthesized in Comparative Example 1. It is seen from FIG. 15 that a single-phase $LiMnPO_4$ has been obtained.

A charging/discharging test was conducted on the test cell fabricated as described above.

The constant current charging was carried out on each test cell. At a time point when the cell voltage reached 4.5V, constant current charging was switched to constant voltage charging, and charging was carried out as the voltage of 4.5V was maintained. The charging was terminated at a time point the current reached a value not larger than 0.05 mA/cm$^2$. The discharging then was carried out at a time point when the cell voltage was lowered to 2.0 V. Meanwhile, charging and discharging were carried our at an ambient temperature of 23° C.

Figure 16:
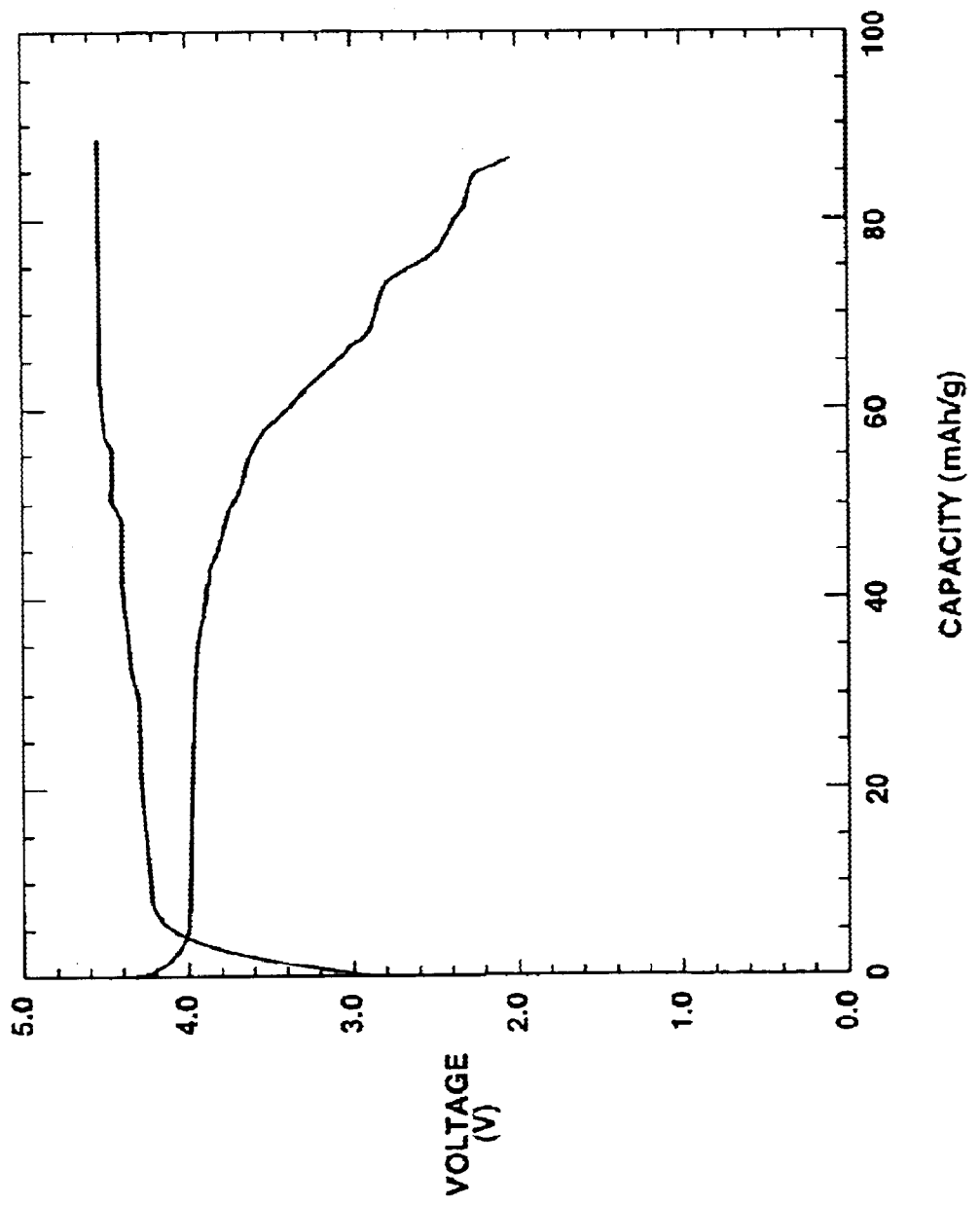
FIG. 16 shows charging/discharging characteristics charging/discharging characteristics of a cell, which uses of $LiMn_{0.8}Ti_{0.2}PO_4$, synthesized at 600° C., in Example 6, as a positive electrode active material.
Figure 17:
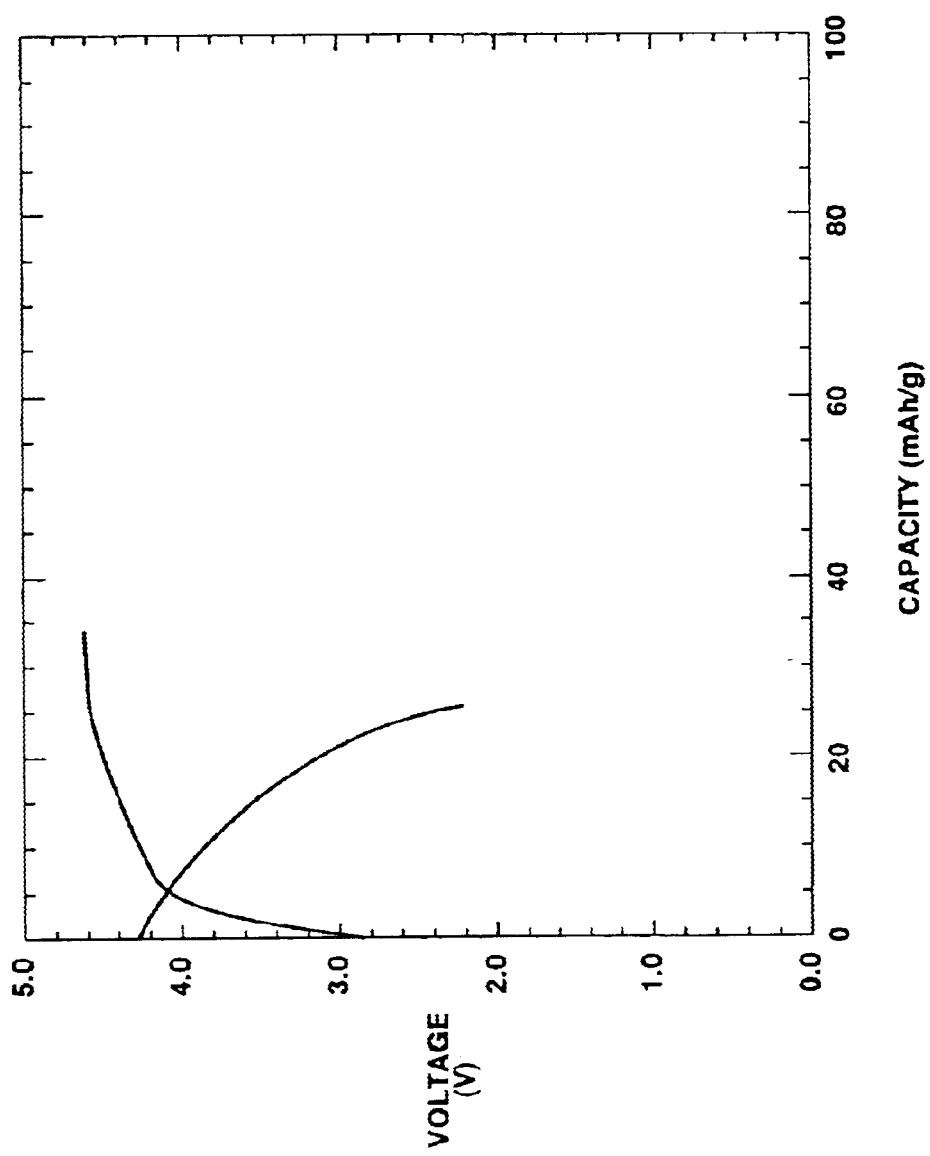
FIG. 17 shows charging/discharging characteristics of a cell which uses $LiMnPO_4$, synthesized in Comparative Example 2, as a positive electrode active material.

FIG. 16 shows charging/discharging characteristics of a cell, which uses LiMn$_{0.8}$Fe$_{0.2}$PO$_4$, synthesized in Example 6 on heating at 600° C., as a positive electrode active material. FIG. 17 shows charging/discharging characteristics of a cell which uses LiMnPO$_4$ synthesized in Comparative Example 1 as a positive electrode active material.

As may be seen from FIG. 16, the cell which uses LiMn$_{0.8}$Fe$_{0.2}$PO$_4$ as the positive electrode active material has flat potentials in the vicinity of 4V to generate the reversible charging/discharging capacity of approximately 85 mAh/g. It is also seen from FIG. 17 that, although single-phase LiMnPO$_4$ having the olivinic structure is used as the positive electrode active material, this cell is not provided with a flat discharge area such that no Mn generation on the redox reaction occurs. It is seen from above that LiMn$_{0.8}$Fe$_{0.2}$PO$_4$, in which Ti has been substituted for part of Mn, and Mn is generated by the redox reaction, can be used as the positive electrode active material having a high discharge voltage.

The favorable effect of substituting Mg for part of Mn in LiMnPO$_4$ was checked.

Example 7

First, LiMn$_{0.8}$Mg$_{0.2}$PO$_4$ was synthesized as a positive electrode active material.

For synthesizing LiMn$_{0.8}$Mg$_{0.2}$PO$_4$, magnesium oxalate MgC$_2$O$_4$.2H$_2$O, manganese carbonate MnCO$_3$, ammonium dihydrogen phosphate NH$_4$H$_2$PO$_4$ and lithium carbonate Li$_2$CO$_3$ were mixed together to a molar ratio of 0.4:1.6:2:1 and pulverized sufficiently in a ball mill for mixing. The resulting mixture then was calcined in a nitrogen atmosphere at 300° C. for three hours to prepare an intermediate synthesized product. This intermediate synthesized product was further pulverized sufficiently in a ball mill for mixing. The resulting mixture was heated in a nitrogen atmosphere for 24 hours at 600° C. to synthesize LiMn$_{0.8}$Mg$_{0.2}$PO$_4$.

A cell was prepared in the same way as in Example 6, using so-prepared LiMn$_{0.8}$Mg$_{0.2}$PO$_4$ as a positive electrode active material.

Figure 19:
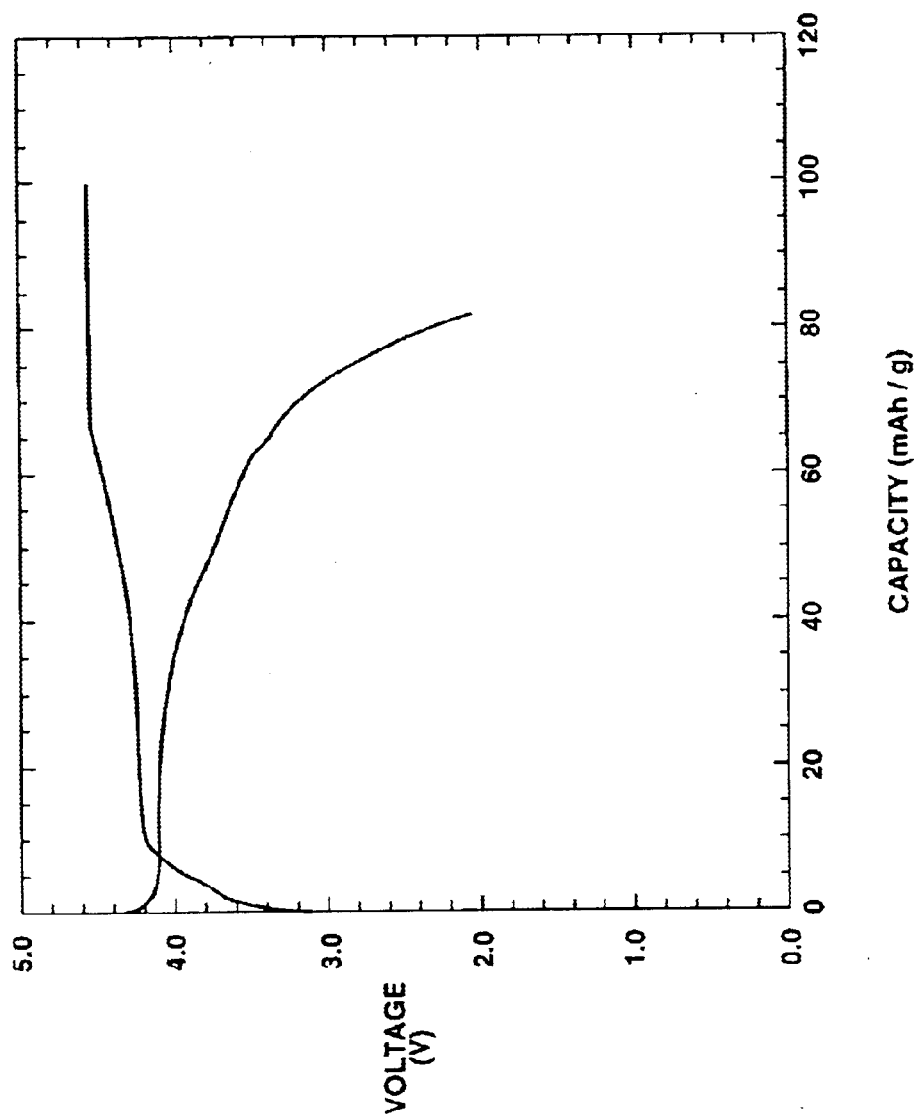
FIG. 19 shows charging/discharging characteristics of a cell which uses $LiMn_{0.8}Ti_{0.2}PO_4$, synthesized in Example 7, as a positive electrode active material.

A powder X-ray diffraction pattern was measured of LiMn$_{0.8}$Mg$_{0.2}$PO$_4$ of Example 7, synthesized by the above-described method, under the same measurement conditions as those of Example 1. The test cell prepared was put to a charging/discharging test in the same way as in Example 6. FIG. 19 shows charging/discharging characteristics of the cell which uses LiMn$_{0.8}$Mg$_{0.2}$PO$_4$ as the positive electrode active material.

Figure 18:
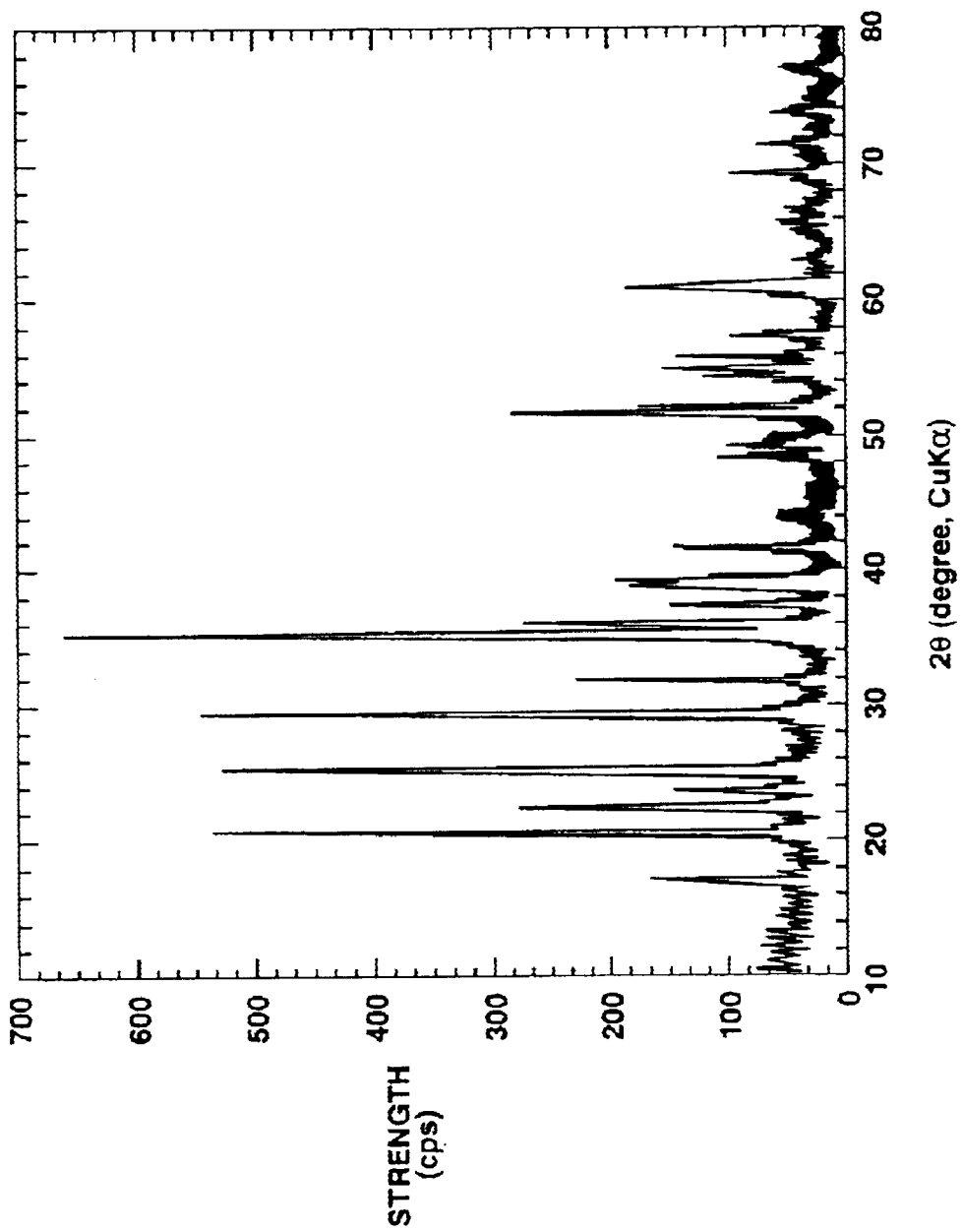
FIG. 18 shows a powder X-ray diffraction pattern of $LiMn_{0.8}Ti_{0.2}PO_4$, synthesized in Example 7.

As may be seen from FIG. 18, it is LiMn$_{0.8}$Mg$_{0.2}$PO$_4$ of the single-phase olivinic structure that has been produced. As may be seen from FIG. 19, the cell which uses this LiMn$_{0.8}$Mg$_{0.2}$PO$_4$ as the positive electrode active material has a flat potential in the vicinity of 4V. It is seen from this that LiMn$_{0.8}$Mg$_{0.2}$PO$_4$, obtained on substituting Mg for part of Mn, is able to yield Mn by the redox such that it may be used as a positive electrode active material having a high discharge voltage.

Then effect of substituting Zn for part of Mn in LiMnPO$_4$ was checked.

Example 8

First, LiMn$_{0.8}$Zn$_{0.2}$PO$_4$ was synthesized as a positive electrode active material.

For synthesizing LiMn$_{0.8}$Zn$_{0.2}$PO$_4$, zinc oxide ZnO$_2$, magnesium oxalate MgC$_2$O$_4$.2H$_2$O, manganese carbonate MnCO$_3$, ammonium dihydrogen phosphate NH$_4$H$_2$PO$_4$ and lithium carbonate Li$_2$CO$_3$ were mixed together to a molar ratio of 0.4:1.6:2:1 and pulverized sufficiently in a ball mill for mixing. The resulting mixture then was calcined in a nitrogen atmosphere at 300° C. for three hours to prepare an intermediate synthesized product. This intermediate synthesized product was further pulverized sufficiently in a ball mill for mixing. The resulting mixture was heated in a nitrogen atmosphere for 24 hours at 600° C. to synthesize LiMn$_{0.8}$Zn$_{0.2}$PO$_4$.

A cell was prepared using so-prepared LiMn$_{0.8}$Zn$_{0.2}$PO$_4$ as a positive electrode active material.

Figure 20:
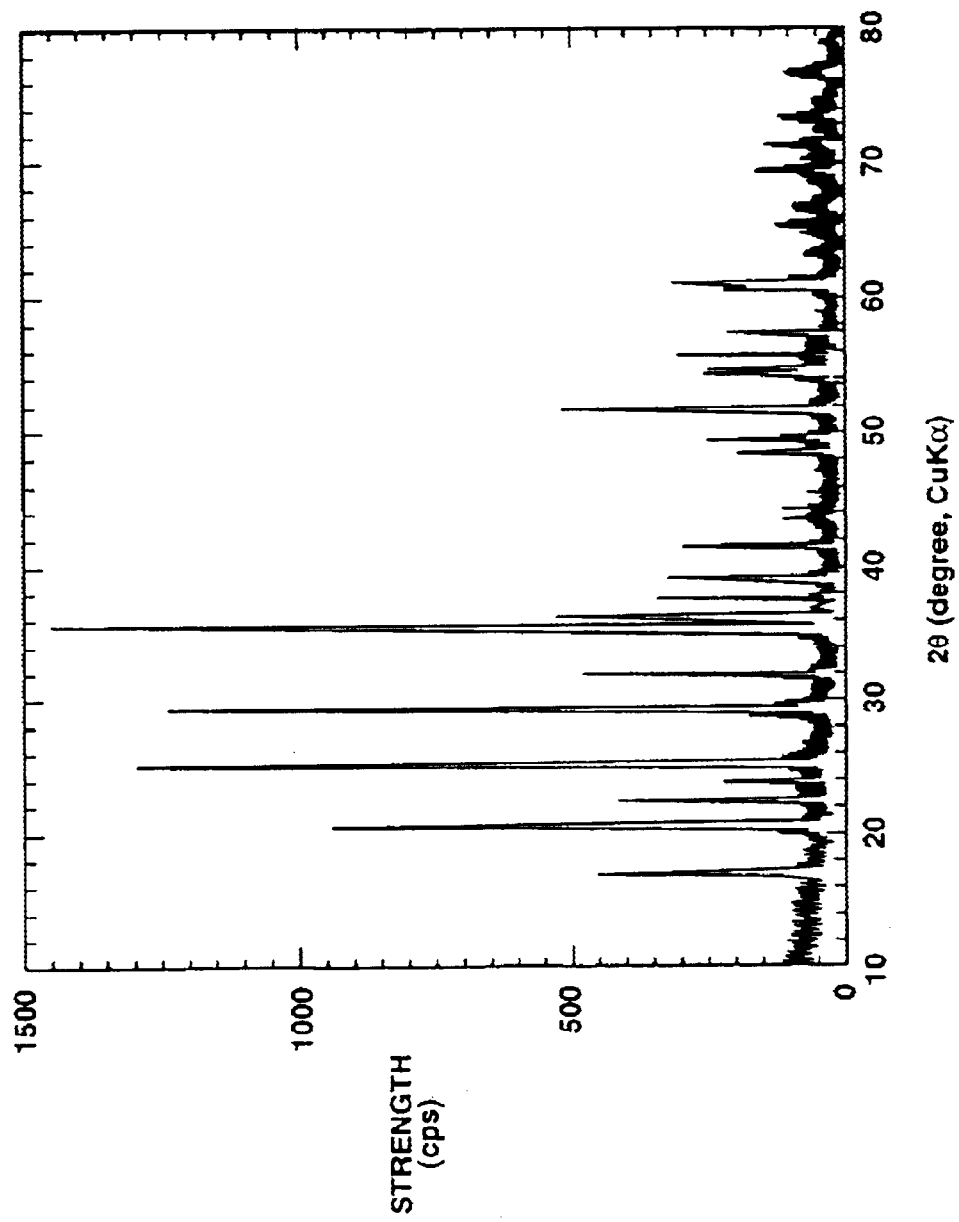
FIG. 20 shows a powder X-ray diffraction pattern of $LiMn_{0.8}Ti_{0.2}PO_4$, synthesized in Example 8.
Figure 21:
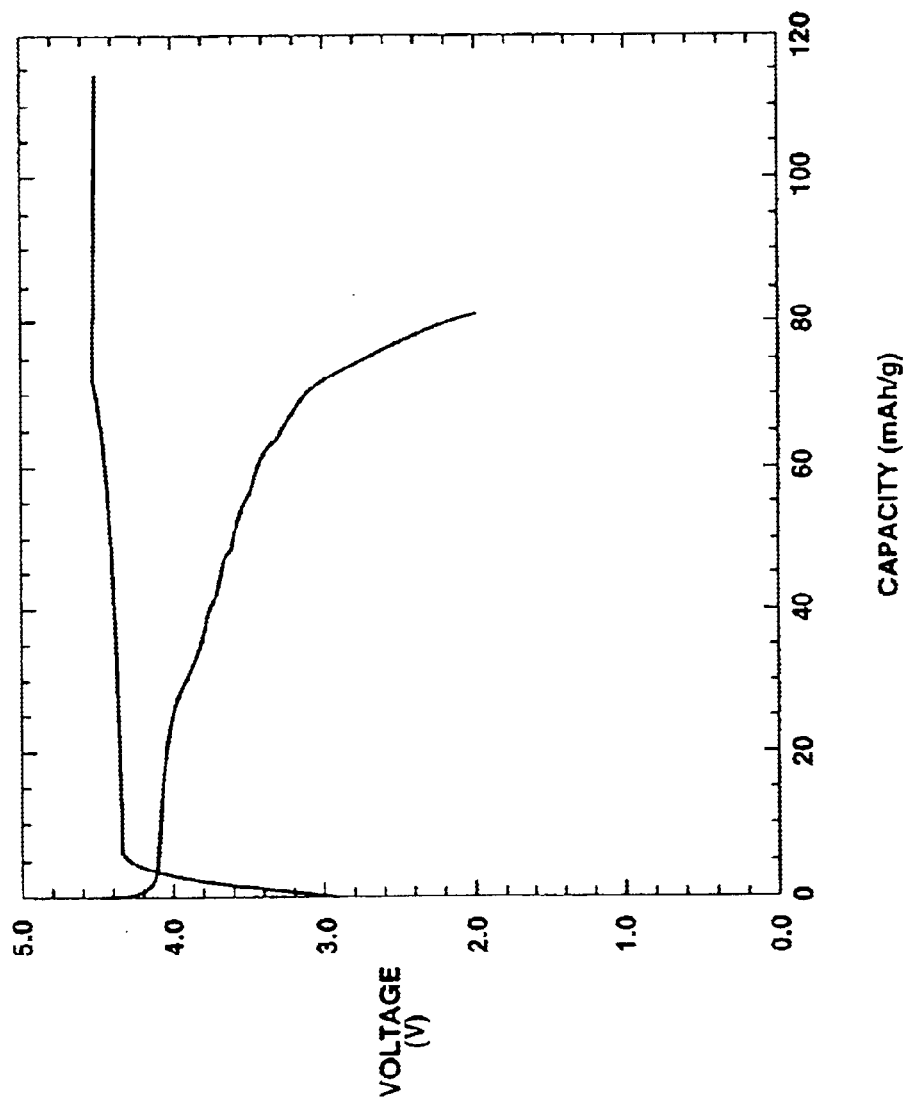
FIG. 21 shows charging/discharging characteristics of a cell which uses $LiMn_{0.8}Ti_{0.2}PO_4$, synthesized in Example 8, as a positive electrode active material.

A powder X-ray diffraction pattern was measured of LiMn$_{0.8}$Zn$_{0.2}$PO$_4$ of Example 8 synthesized by the above-described method, under the same measurement conditions as those of Example 6. FIG. 20 shows a powder X-ray diffraction pattern of LiMn$_{0.8}$Mg$_{0.2}$PO$_4$. The test cell prepared was put to a charging/discharging test in the same way as in Example 6. FIG. 21 shows charging/discharging characteristics of the cell which uses LiMn$_{0.8}$Zn$_{0.2}$PO$_4$ as the positive electrode active material.

As may be seen from FIG. 20, it is LiMn$_{0.8}$Zn$_{0.2}$PO$_4$ of the single-phase olivinic structure that has been produced. As may be seen from FIG. 21, the cell which uses this LiMn$_{0.8}$Zn$_{0.2}$PO$_4$ as the positive electrode active material has a flat potential in the vicinity of 4V. It is seen from this that LiMn$_{0.8}$Zn$_{0.2}$PO$_4$, obtained on substituting Mg for part of Mn, is able to realize Mn redox generation such that it may be used as a positive electrode active material having a high discharge voltage.

The favorable effect of substituting Co for part of Mn in LiMnPO$_4$ was checked.

Example 9

First, LiMn$_{0.8}$Co$_{0.2}$PO$_4$ was synthesized as a positive electrode active material.

For synthesizing LiMn$_{0.8}$Co$_{0.2}$PO$_4$, cobalt oxalate CoC$_2$O$_4$.2H$_2$O, manganese carbonate MnCO$_3$, ammonium dihydrogen phosphate NH$_4$H$_2$PO$_4$ and lithium carbonate Li$_2$CO$_3$ were mixed together to a molar ratio of 0.4:1.6:2:1 and pulverized sufficiently in a ball mill for mixing. The resulting mixture then was calcined in a nitrogen atmosphere at 300° C. for three hours to prepare an intermediate synthesized product. This intermediate synthesized product was further pulverized sufficiently in a ball mill for mixing. The resulting mixture was heated in a nitrogen atmosphere for 24 hours at 600° C. to synthesize LiMn$_{0.8}$Zn$_{0.2}$PO$_4$.

A cell was prepared using so-prepared LiMn$_{0.8}$Zn$_{0.2}$PO$_4$ as a positive electrode active material.

Figure 22:
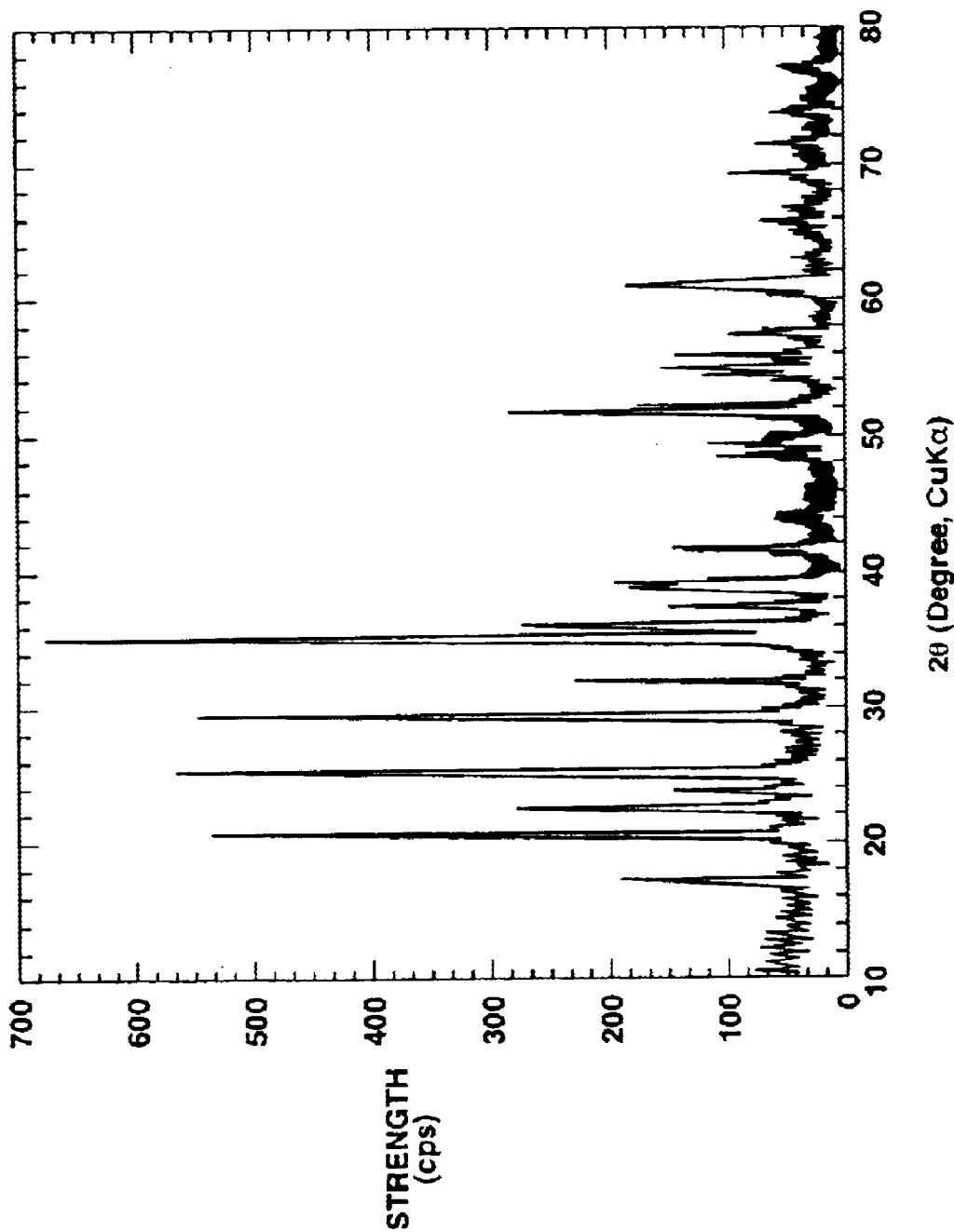
FIG. 22 shows a powder X-ray diffraction pattern of $LiMn_{0.8}Ti_{0.2}PO_4$, synthesized in Example 9.

A powder X-ray diffraction pattern was measured of LiMn$_{0.8}$Co$_{0.2}$PO$_4$ of Example 9 synthesized by the above-described method, under the same measurement conditions as those of Example 6. FIG. 22 shows a powder X-ray diffraction pattern of LiMn$_{0.8}$Co$_{0.2}$PO$_4$. The test cell prepared was put to a charging/discharging test in the same way as in Example 6. FIG. 21 shows charging/discharging characteristics of the cell which uses LiMn$_{0.8}$CO$_{0.2}$PO$_4$ as the positive electrode active material.

27

Figure 23:
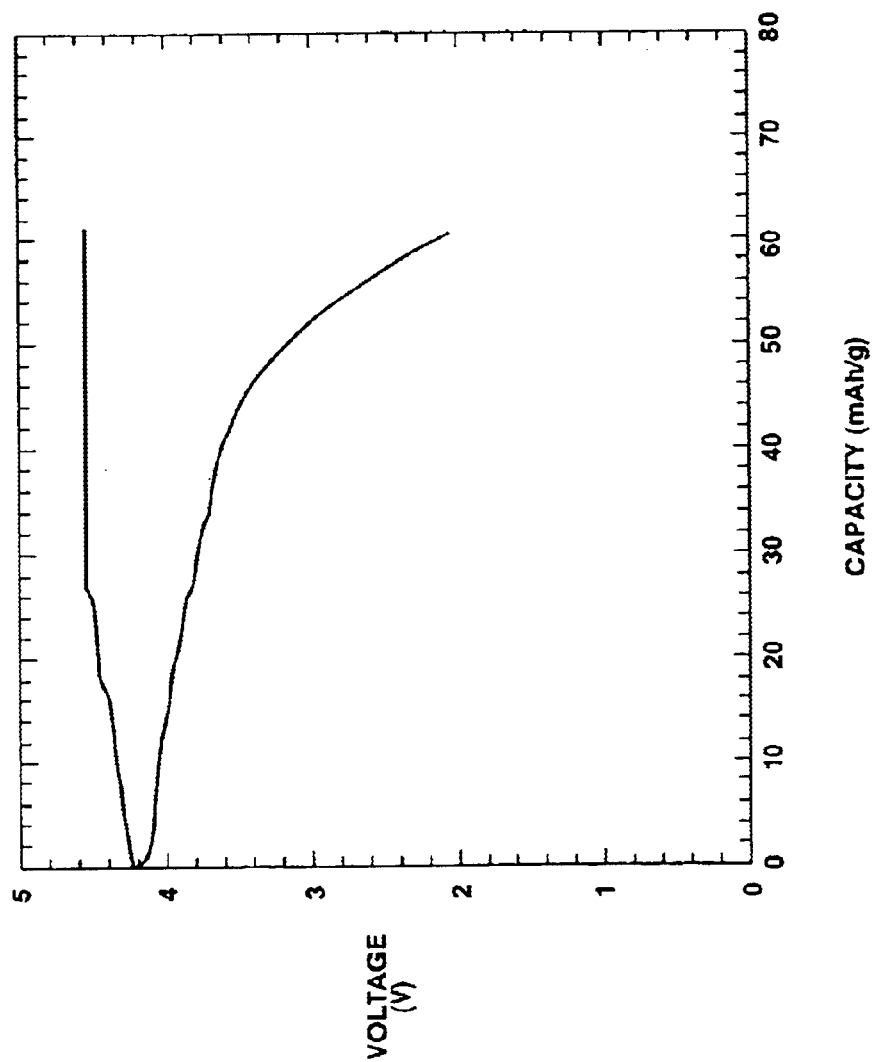
FIG. 23 shows charging/discharging characteristics of a cell which uses $LiMn_{0.8}Ti_{0.2}PO_4$, synthesized in Example 9, as a positive electrode active material.

As may be seen from FIG. 22, it is $LiMn_{0.8}Co_{0.2}PO_4$ of the single-phase olivinic structure that has been produced. As may be seen from FIG. 23, the cell which uses this $LiMn_{0.8}Co_{0.2}PO_4$ as the positive electrode active material has a flat potential in the vicinity of 4V. It is seen from this that $LiMn_{0.8}Co_{0.2}PO_4$, obtained on substituting Co for part of Mn, is able to realize Mn redox generation such that it may be used as a positive electrode active material having a high discharge voltage.

Next, the favorable effect of substituting Fe and Ti, as plural metal elements, for part of Mn in $LiMnPO_4$, was checked.

Example 10

First, $LiMn_{0.7}Fe_{0.2}Ti_{0.1}PO_4$ was synthesized as a positive electrode active material.

For synthesizing $LiMn_{0.7}Fe_{0.2}Ti_{0.1}PO_4$, manganese carbonate $MnCO_3$, iron oxalate $FeC_2O_4 \cdot 2H_2O$, titanium oxide $TiO_2$, ammonium dihydrogen phosphate $NH_4H_2PO_4$ and lithium carbonate $Li_2CO_3$ were mixed together to a molar ratio of 1.4:0.4:0.2:2:1 and pulverized sufficiently in a ball mill for mixing. The resulting mixture then was calcined in a nitrogen atmosphere at 300° C. for three hours to prepare an intermediate synthesized product. This intermediate synthesized product was further pulverized sufficiently in a ball mill for mixing. The resulting mixture was heated in a nitrogen atmosphere for 24 hours at 600° C. to synthesize $LiMn_{0.7}Fe_{0.2}Ti_{0.1}PO_4$.

A test cell was prepared using the $LiMn_{0.7}Fe_{0.2}Ti_{0.1}PO_4$, prepared as described above, as a positive electrode active material.

Figure 24:
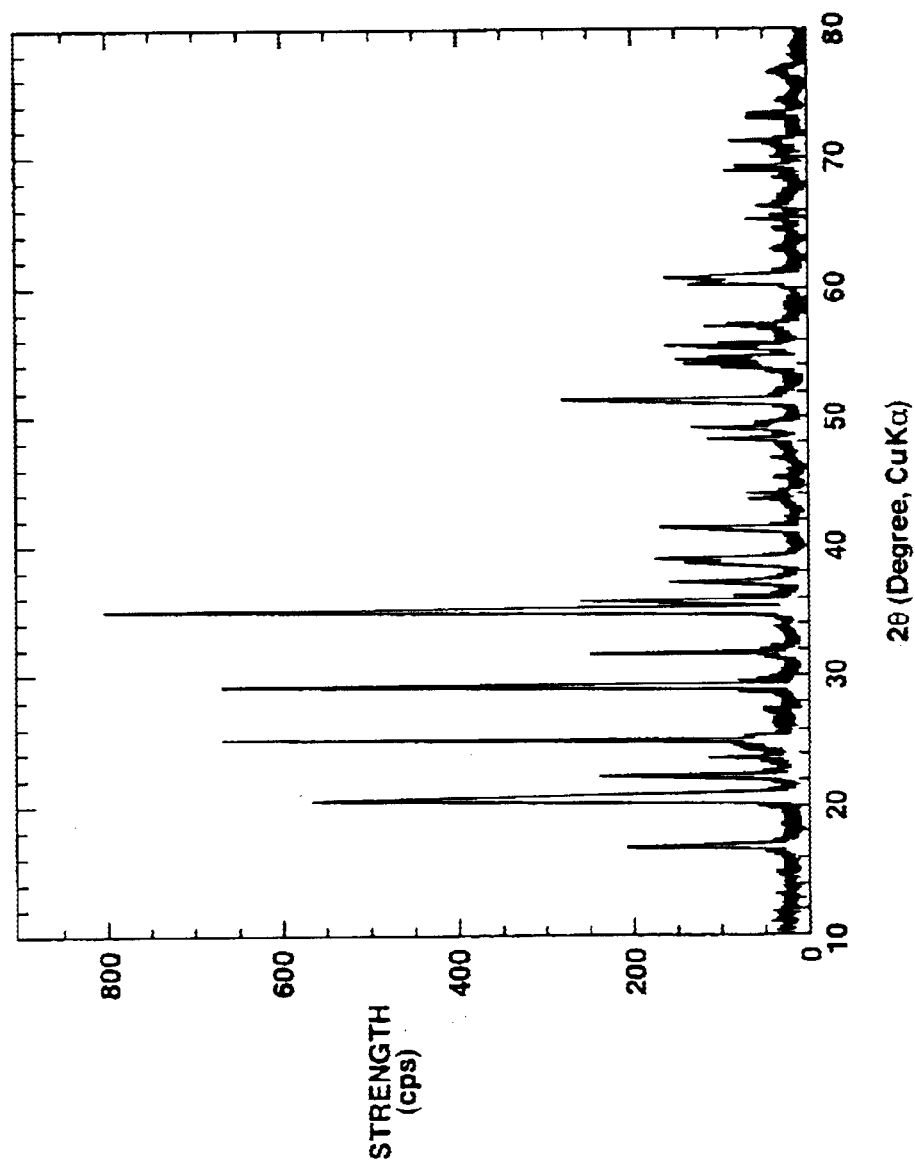
FIG. 24 shows a powder X-ray diffraction pattern of $LiMn_{0.7}Fe_{0.2}Ti_{0.1}PO_4$, synthesized in Example 9.
Figure 25:
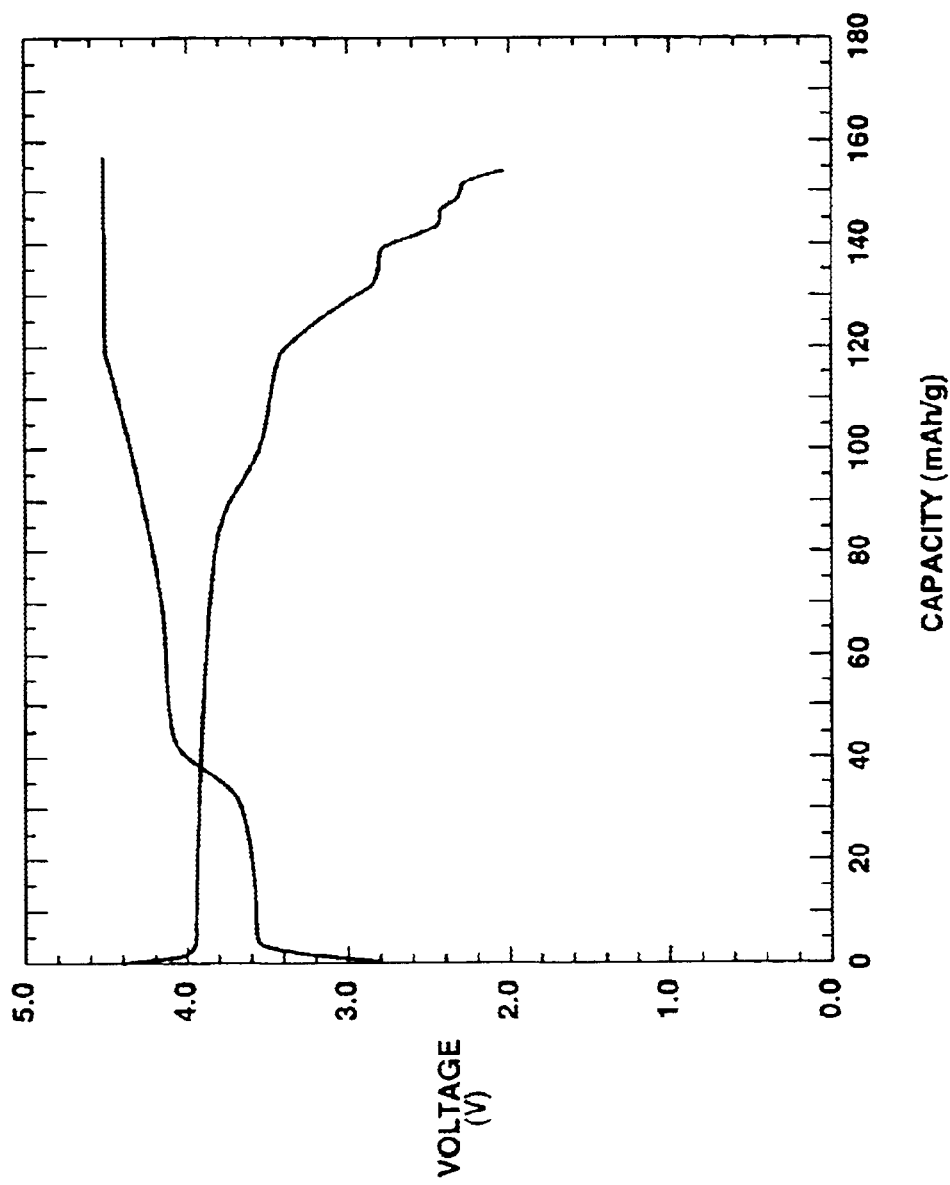
FIG. 25 shows charging/discharging characteristics of a cell which uses $LiMn_{0.7}Fe_{0.2}Ti_{0.1}PO_4$ synthesized in Example 10.

A powder X-ray diffraction pattern was measured of $LiMn_{0.7}Fe_{0.2}Ti_{0.1}PO_4$ of Example 10 synthesized by the above-described method under the same measurement conditions as those of Example 6. The powder X-ray diffraction pattern of $LiMn_{0.7}Fe_{0.2}Ti_{0.1}PO_4$ is shown in FIG. 24. A charging/discharging test was conducted on the test cell, thus prepared, in the same way as in Example 6. FIG. 25 shows charging/discharging characteristics of a cell which uses $LiMn_{0.7}Fe_{0.25}Mg_{0.05}PO_4$ as the positive electrode active material.

As apparent from FIG. 24, it is $LiMn_{0.7}Fe_{0.2}Ti_{0.1}PO_4$, having the single-phase olivinic structure, that has been produced. As apparent from FIG. 25, the cell prepared using this $LiMn_{0.7}Fe_{0.2}Ti_{0.1}PO_4$ as the positive electrode active material has a flat potential in the vicinity of 4V. It may be seen from thus that $LiMn_{0.7}Fe_{0.2}Ti_{0.1}PO_4$, obtained on replacing part of Mn and Fe as plural metal elements with Mg, is able to generate Mn by a redox reaction and hence may be used as a positive electrode active material having a high discharge voltage.

It has also been seen that a discharge voltage as high as 155 mAh/g may be achieved by replacing Mn with plural metal elements Fe and Ti.

Next, the favorable effect of substituting Fe and Mg, as plural metal elements, for part of Mn in $LiMnPO_4$, was checked.

Example 11

First, $LiMn_{0.7}Fe_{0.25}Mg_{0.05}PO_4$ was synthesized as a positive electrode active material.

For synthesizing $LiMn_{0.7}Fe_{0.25}Mg_{0.05}PO_4$, manganese carbonate $MnCO_3$, iron oxalate $FeC_2O_4 \cdot 2H_2O$, magnesium oxalate $MgC_2O_4 \cdot 2H_2O$, ammonium dihydrogen phosphate $NH_4H_2PO_4$ and lithium carbonate $Li_2CO_3$ were mixed together to a molar ratio of 1.4:0.5:0.1:2:1 and pulverized sufficiently in a ball mill for mixing. The resulting mixture then was calcined in a nitrogen atmosphere at 300° C. for three hours to prepare an intermediate synthesized product. This intermediate synthesized product was further pulverized sufficiently in a ball mill for mixing. The resulting mixture was heated in a nitrogen atmosphere for 24 hours at 600° C. to synthesize $LiMn_{0.7}Fe_{0.25}Mg_{0.05}PO_4$.

A test cell was prepared using the $LiMn_{0.7}Fe_{0.25}Mg_{0.05}PO_4$, prepared as described above, as a positive electrode active material.

Figure 26:
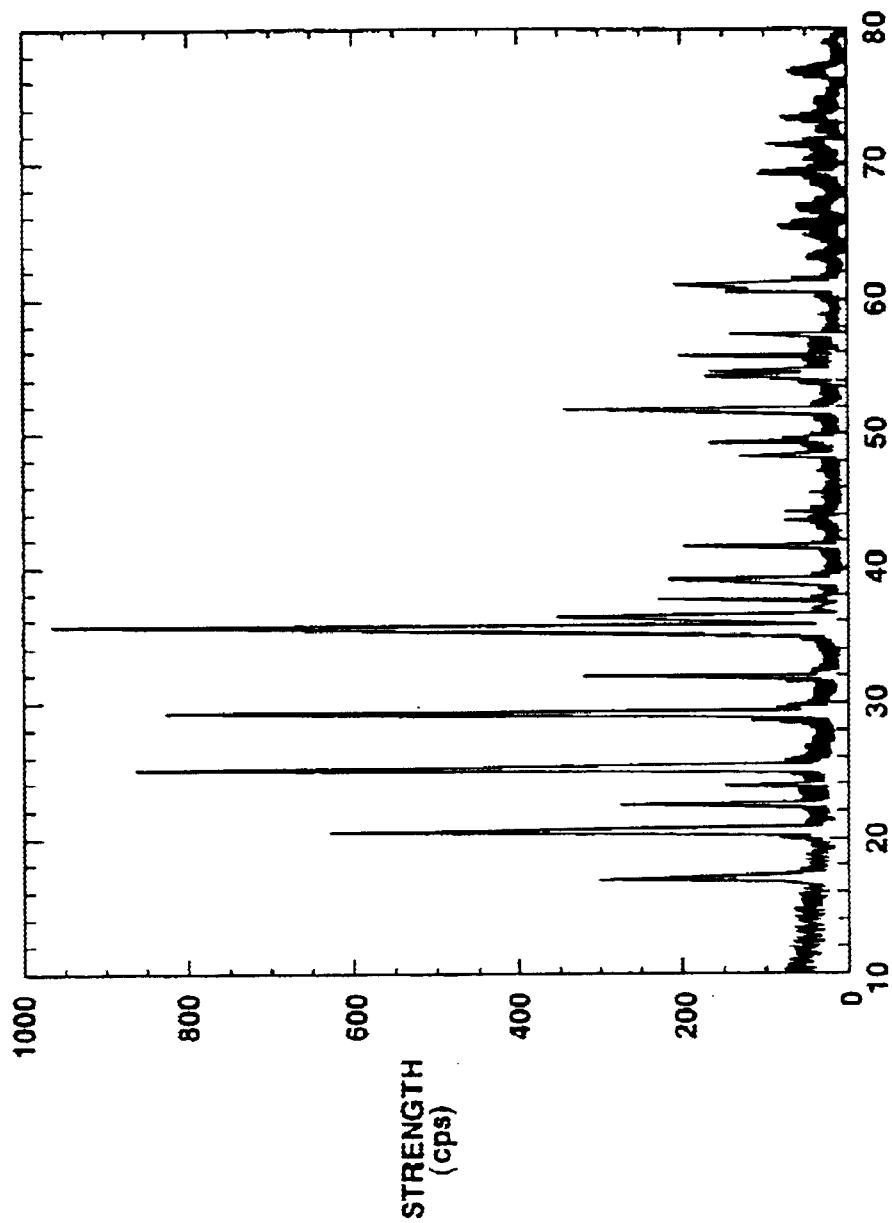
FIG. 26 shows a powder X-ray diffraction pattern of $LiMn_{0.7}Fe_{0.25}Ti_{0.05}PO_4$ synthesized in Example 5.
Figure 27:
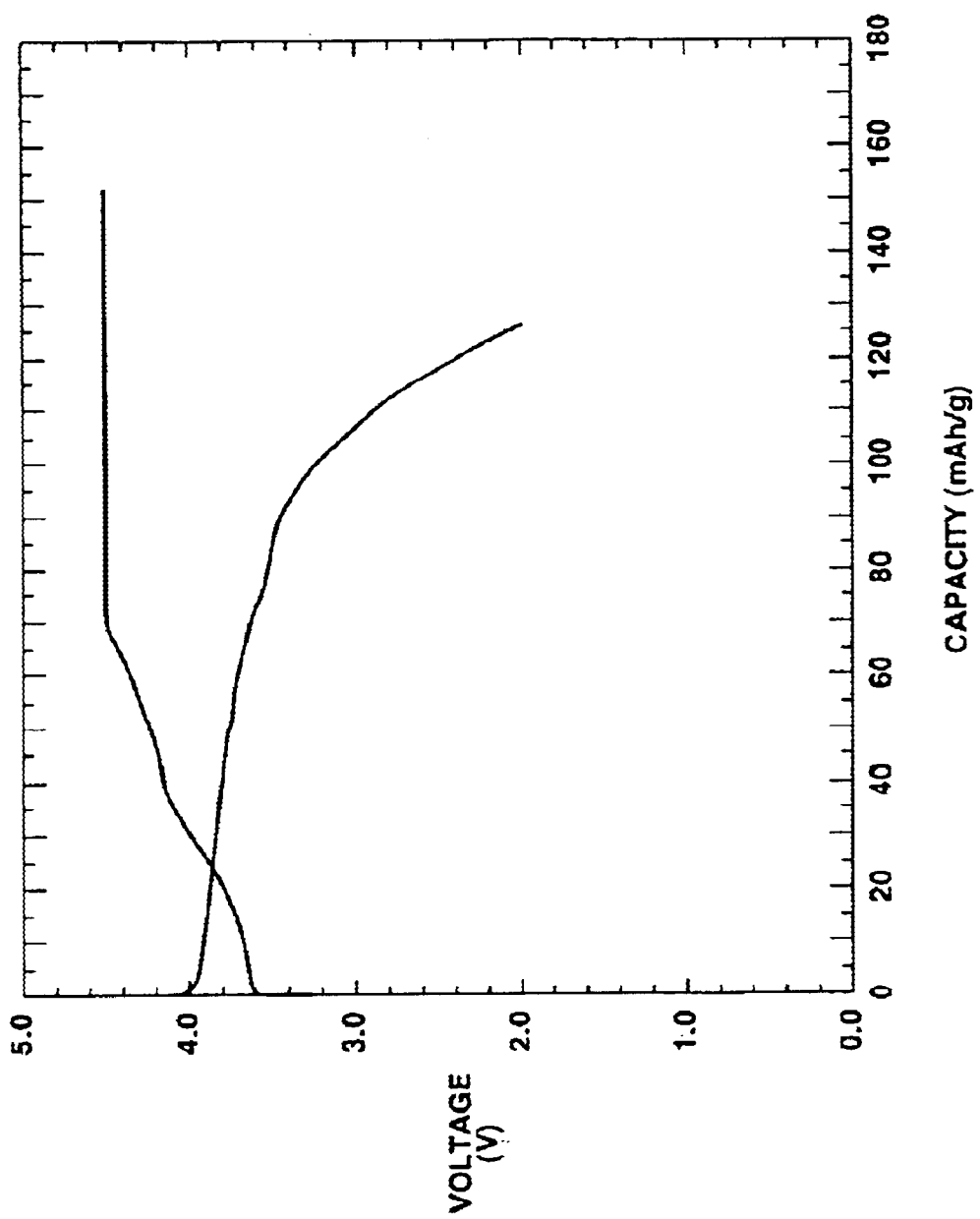
FIG. 27 shows charging/discharging characteristics of a cell which uses $LiMn_{0.7}Fe_{0.25}Ti_{0.05}PO_4$, synthesized in Example 5, as the positive electrode active material.

A powder X-ray diffraction pattern was measured of $LiMn_{0.7}Fe_{0.25}Mg_{0.05}PO_4$, of Example 11 synthesized by the above-described method under the same measurement conditions as those of Example 6. The powder X-ray diffraction pattern of $LiMn_{0.7}Fe_{0.25}Mg_{0.05}PO_4$ is shown in FIG. 26. A charging/discharging test was conducted on the test cell, thus prepared, in the same way as in Example 6. FIG. 27 shows charging/discharging characteristics of a cell which uses $LiMn_{0.7}Fe_{0.25}Mg_{0.05}PO_4$ as the positive electrode active material.

As apparent from FIG. 26, it is $LiMn_{0.7}Fe_{0.25}Mg_{0.05}PO_4$, having the single-phase olivinic structure, that has been produced. As apparent from FIG. 27, the cell prepared using this $LiMn_{0.7}Fe_{0.25}Mg_{0.05}PO_4$ as the positive electrode active material has a flat potential in the vicinity of 4V. It may be seen from thus that $LiMn_{0.7}Fe_{0.25}Mg_{0.05}PO_4$, obtained on replacing part of Mn with Fe and Mg, is able to yield Mn by a redox reaction and hence may be used as a positive electrode active material having a high discharge voltage.

It has also been seen that a discharge voltage higher than is possible in Example 7, in which Mn is replaced solely by Mg, may be achieved by replacing Mn with plural metal elements Fe and Ti.

What is claimed is:

1. A positive electrode active material comprising a compound represented by the general formula $Li_xMn_yFe_{1-y}PO_4$, where $0<x\leq2$ and $0.5<y<0.95$ and an electrification agent in an amount of 0.5 to 20 parts by weight to 100 parts by weight of $Li_xMn_yFe_{1-y}PO_4$, wherein a portion of the $Li_xMn_yFe_{1-y}PO_4$ has a grain size not lager than 10 um, with the Bulnauer Emmet Taylor specific surface area not being less than 0.5 $m^2/g$.

2. The positive electrode material according to claim 1, wherein the electrification agent is made of carbon, copper or any electrically conductive high polymer material.

3. A positive electrode active material comprising a compound represented by the general formula $Li_xMn_yFe_zA_{1-(y+z)}PO_4$, where $0<x\leq2$, $0.5<y<0.95$, $0.5<y+z<1$ and A is at least one metal element selected from Ti and Ag, wherein a portion of the $Li_xMn_yFe_zA_{1-(y+z)}PO_4$ has a grain size not lager than 10 μm, with the Bulnauer Emmet Taylor specific surface area being not less than 0.5 $m^2/g$.

4. A non-aqueous electrolyte cell comprising:
   a positive electrode containing a positive electrode active material;
   a negative electrode containing a negative electrode active material; and
   an electrolyte interposed between said positive and negative electrodes; wherein
   said positive electrode active material contains a compound represented by the general formula $Li_xMn_yFe_{1-y}PO_4$ where $0<x\leq2$ and $0.5<y<0.95$ and an electrification agent in an amount of 0.5 to 20 carts by weight to 100 parts by weight of $Li_xMn_yFe_{1-y}PO_4$, wherein a portion of the $Li_xMn_yFe_{1-y}PO_4$ has a grain size not larger than 10 μm, with the Bulnauer Emmet Taylor specific surface area being not less than 0.5 m$^2$/g.

5. The positive electrode material according to claim 4, wherein the electrification agent is made of carbon, copper or any electrically conductive high polymer material.

6. A non-aqueous electrolyte cell comprising:

a positive electrode containing a positive electrode active material;

a negative electrode containing a negative electrode active material; and an electrolyte interposed between said positive and negative electrodes; wherein said positive electrode active material contains a compound represented by the general formula $Li_xMn_yFe_zA_{1-(y+z)}PO_4$ where $0<x\leq2$, $0.5<y<0.95$ and $0.5<y+z<1$ and wherein A is at least one metal element selected from Ti and Mg, wherein a portion of the $Li_xMn_yFe_zA_{1-(y+z)}PO_4$ has a grain size not larger than 10 μm, with the Bulnauer Emmet Taylor specific surface area being not less than 0.5 m$^2$/g.

7. A positive electrode active material comprising a compound represented by the general formula $Li_xMn_yB_{1-y}PO_4$, where $0<x\leq2$ and $0<y<1$ and an electrification agent in an amount of 0.5 to 20 parts by weight to 100 parts by weight of $Li_xMn_yB_{1-y}PO_4$, wherein B is a metal element selected from among Ti, Zn, Mg and Co, wherein a portion of the $Li_xMn_yB_{1-y}PO_4$ has a grain size not larger than 10 μm, with the Bulnauer Emmet Taylor specific surface area being not less than 0.5 m$^2$/g.

8. The positive electrode material according to claim 7, wherein the electrification agent is made of carbon, copper or any electrically conductive high polymer material.

9. A positive electrode active material comprising a compound represented by the general formula $Li_xMn_yB_{1-y}PO_4$, where $0<x\leq2$ and $0<y<1$ and an electrification agent in an amount of 0.5 to 20 parts by weight to 100 parts by weight of $Li_xMn_yB_{1-y}PO_4$, wherein B denotes plural metal elements selected from among Ti, Fe, Zn, Mg and Co, wherein a portion of the $Li_xMn_yB_{1-y}PO_4$ has a grain size not larger than 10 μm, with the Bulnauer Emmet Taylor specific surface area being not less than 0.5 m$^2$/g.

10. The positive electrode material according to claim 9, wherein the electrification agent is made of carbon, copper or any electrically conductive high polymer material.

11. A non-aqueous electrolyte cell comprising:

a positive electrode containing a positive electrode active material;

a negative electrode containing a negative electrode active material; and an electrolyte interposed between said positive and negative electrodes; wherein said positive electrode active material contains a compound represented by the general formula $Li_xMn_yB_{1-y}PO_4$ where $0<x\leq2$ and $0<y<1$ and an electrification agent in an amount of 0.5 to 20 parts by weight to 100 parts by weight of $Li_xMn_yB_{1-y}PO_4$, wherein B denotes one metal element selected from among Ti, Zn, Mg and Co, wherein a portion of the $Li_xMn_yB_{1-y}PO_4$ has a grain size not larger than 10 μm, with the Bulnauer Emmet Taylor specific surface area being not less than 0.5 m$^2$/g.

12. The positive electrode material according to claim 11, wherein the electrification agent is made of carbon, copper or any electrically conductive high polymer material.

13. A non-aqueous electrolyte cell comprising:

a positive electrode containing a positive electrode active material;

a negative electrode containing a negative electrode active material; and an electrolyte interposed between said positive and negative electrodes; wherein said positive electrode active material contains a compound represented by the general formula $Li_xMn_yB_{1-y}PO_4$, where $0<x\leq2$ and $0<y<1$ and an electrification agent in an amount of 0.5 to 20 parts by weight to 100 parts by weight of $Li_xMn_yB_{1-y}PO_4$, wherein B denotes one metal elements selected from among Ti, Fe, Zn, Mg and Co, wherein a portion of the $Li_xMn_yB_{1-y}PO_4$ has a grain size not larger than 10 μm, with the Bulnauer Emmet Taylor specific surface area being not less than 0.5 m$^2$/g.

14. The positive electrode material according to claim 13, wherein the electrification agent is made of carbon, copper or any electrically conductive high polymer material.

* * * * *

UNITED STATES PATENT AND TRADEMARK OFFICE
CERTIFICATE OF CORRECTION

PATENT NO.    : 6,749,967 B2
DATED         : June 15, 2004
INVENTOR(S)   : Li, Guohua and Yamada, Atsuo Page 1 of 1

It is certified that error appears in the above-identified patent and that said Letters Patent is hereby corrected as shown below:

Column 3,
Line 32, "...metal element selected from Ti and Ag." should read -- metal element selected from Ti and Mg --.

Column 28,
Line 50, "...least one metal selected from Ti and Ag, wherein a..." should read -- least one metal element selected from Ti and Mg, wherein a --.

Signed and Sealed this

Twenty-third Day of November, 2004

JON W. DUDAS
*Director of the United States Patent and Trademark Office*